United States Patent
Nishimura et al.

(10) Patent No.: US 9,201,899 B2
(45) Date of Patent: Dec. 1, 2015

(54) TRANSPOSITION OPERATION DEVICE, INTEGRATED CIRCUIT FOR THE SAME, AND TRANSPOSITION METHOD

(75) Inventors: Takashi Nishimura, Osaka (JP); Hiroyuki Morishita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 267 days.

(21) Appl. No.: 13/824,865

(22) PCT Filed: Sep. 11, 2012

(86) PCT No.: PCT/JP2012/005743
§ 371 (c)(1),
(2), (4) Date: Mar. 18, 2013

(87) PCT Pub. No.: WO2013/054468
PCT Pub. Date: Apr. 18, 2013

(65) Prior Publication Data
US 2014/0003742 A1    Jan. 2, 2014

(30) Foreign Application Priority Data

Oct. 14, 2011    (JP) .................................. 2011-227127

(51) Int. Cl.
G06F 17/30    (2006.01)
G06F 9/30    (2006.01)

(52) U.S. Cl.
CPC ...... *G06F 17/30244* (2013.01); *G06F 9/30032* (2013.01); *G06F 9/30109* (2013.01)

(58) Field of Classification Search
None
See application file for complete search history.

(56) References Cited

U.S. PATENT DOCUMENTS

| 5,386,233 | A | * | 1/1995 | Keith | 375/240.07 |
| 5,600,843 | A | * | 2/1997 | Kato et al. | 712/19 |
| 5,684,534 | A | * | 11/1997 | Harney et al. | 375/240.25 |
| 5,784,427 | A | * | 7/1998 | Bennett et al. | 377/72 |

(Continued)

FOREIGN PATENT DOCUMENTS

| JP | 10-154140 | 6/1998 |
| JP | 2005-149492 | 6/2005 |

OTHER PUBLICATIONS

Translation of JP2005-149492 (IDS document).*

(Continued)

*Primary Examiner* — Michelle Entezari
(74) *Attorney, Agent, or Firm* — Wenderoth, Lind & Ponack, L.L.P.

(57) ABSTRACT

A transposition operation device includes: a register group storing a matrix of data such that elements are readable one at a time; an output data rearrangement unit rearranging elements in each row of the matrix so that elements in a same column of the matrix are in different columns of the matrix after rearrangement; a register access unit writing the matrix after rearrangement to the register group and reading the elements in the same column by using column position information indicating positions in the register group at which the elements in the same column are stored; an input data rearrangement unit rearranging the read elements; an operation unit performing an operation on the rearranged elements; and a transposition control unit generating rearrangement information and the column position information to control rearrangement, and performs transposition at high speed by performing rearrangement at the time of storing/reading data in/from the register group.

15 Claims, 21 Drawing Sheets

(56) References Cited

U.S. PATENT DOCUMENTS

| | | | |
|---|---|---|---|
| 5,815,421 A * | 9/1998 | Dulong et al. | 708/520 |
| 5,995,579 A * | 11/1999 | Vatinel | 377/69 |
| 6,014,143 A * | 1/2000 | Naqvi et al. | 345/424 |
| 6,021,420 A | 2/2000 | Takamuki | |
| 6,538,657 B1 * | 3/2003 | Kabir et al. | 345/561 |
| 6,930,800 B1 * | 8/2005 | Adachi et al. | 358/3.13 |
| 7,106,860 B1 * | 9/2006 | Yu et al. | 380/37 |
| 7,243,210 B2 * | 7/2007 | Pedersen et al. | 711/220 |
| 7,313,645 B2 * | 12/2007 | Hasegawa | 711/5 |
| 8,175,853 B2 * | 5/2012 | Magerlein | 703/2 |
| 8,892,848 B2 * | 11/2014 | Sprangle et al. | 712/6 |
| 2004/0148560 A1 * | 7/2004 | Hocevar | 714/801 |
| 2005/0108503 A1 | 5/2005 | Sandon et al. | |
| 2010/0008429 A1 * | 1/2010 | Endresen | 375/240.24 |
| 2011/0107060 A1 * | 5/2011 | McAllister et al. | 712/22 |

OTHER PUBLICATIONS

Translation of JP 10-154140 (IDS document).*
International Search Report issued Oct. 23, 2012 in International (PCT) Application No. PCT/JP2012/005743.

* cited by examiner

FIG.7A Circular shift performed on output data
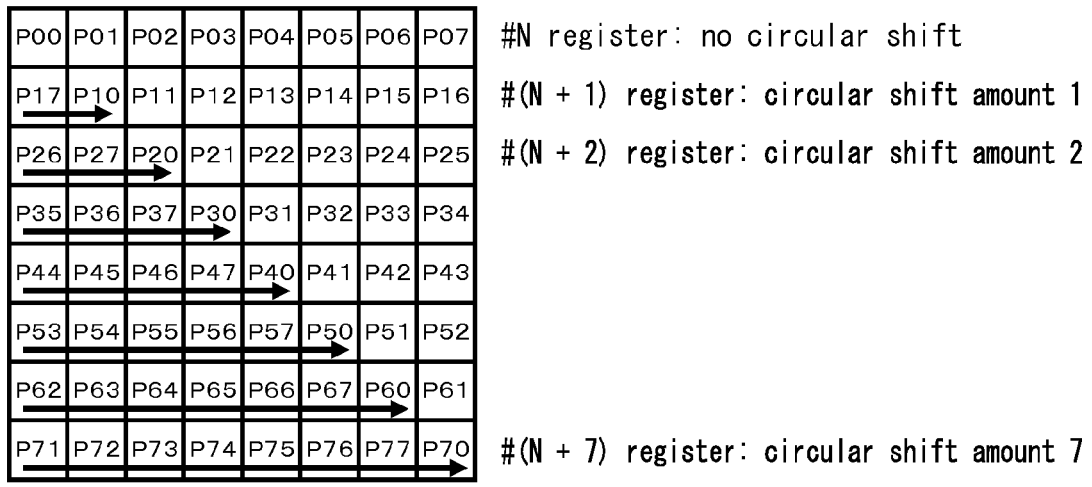
N register: no circular shift
(N + 1) register: circular shift amount 1
(N + 2) register: circular shift amount 2
(N + 7) register: circular shift amount 7
FIG.7B P*0 Offset-reading
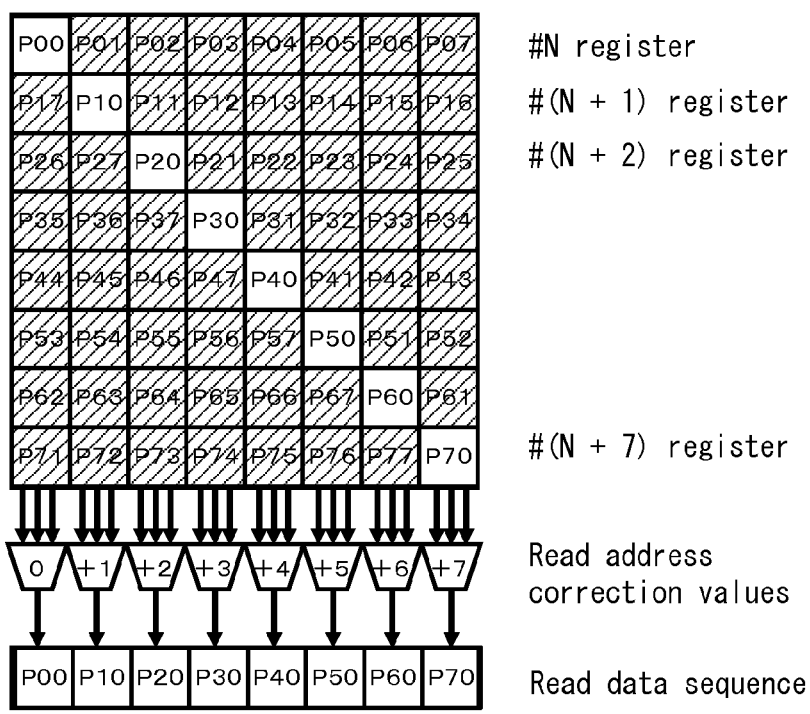
N register
(N + 1) register
(N + 2) register
(N + 7) register
Read address correction values
Read data sequence FIG.8C P*1 Offset-reading
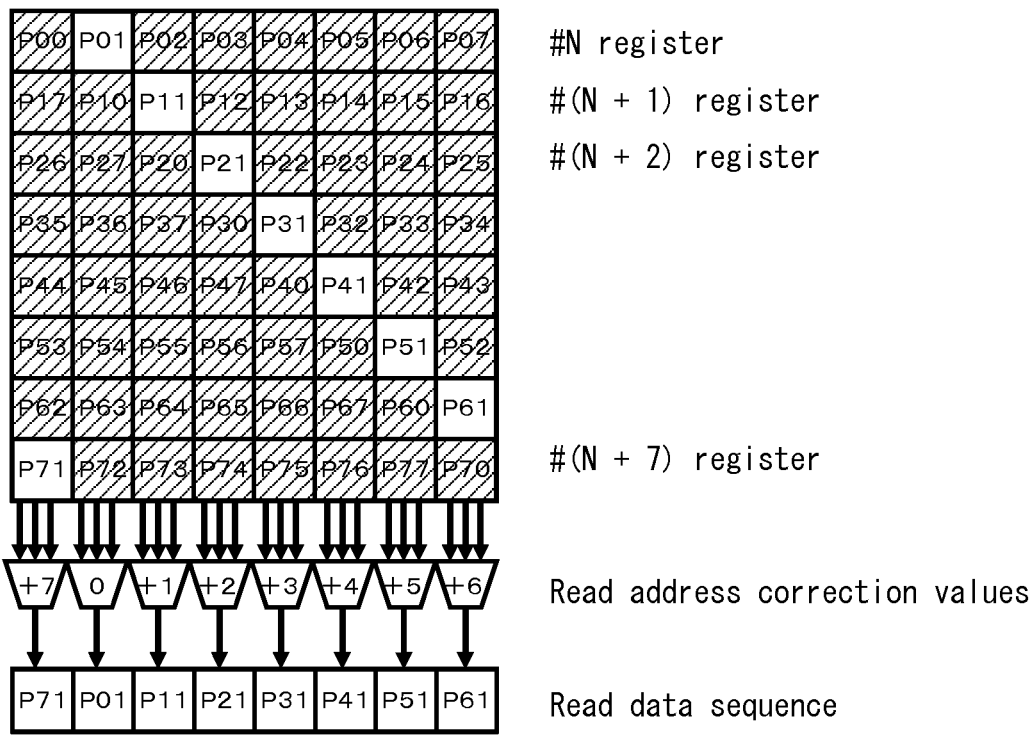
FIG.8D P*7 Offset-reading
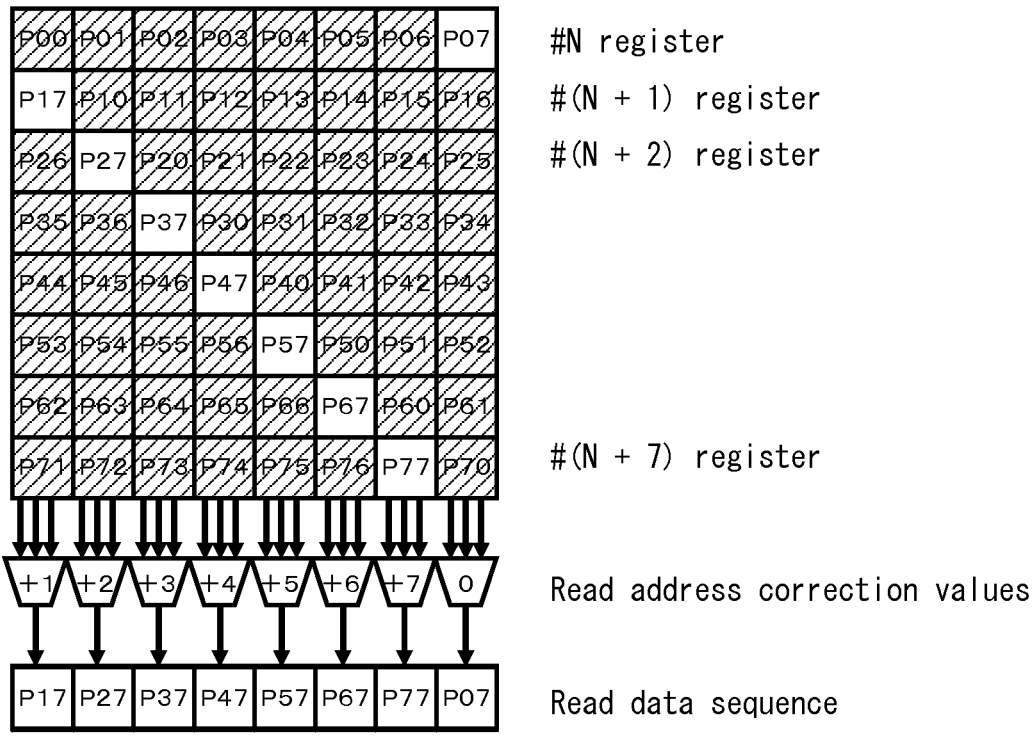

FIG.9E Completion of rearrangement performed on input data

| P00 | P10 | P20 | P30 | P40 | P50 | P60 | P70 |
|-----|-----|-----|-----|-----|-----|-----|-----|
| P01 | P11 | P21 | P31 | P41 | P51 | P61 | P71 |
| P02 | P12 | P22 | P32 | P42 | P52 | P62 | P72 |
| P03 | P13 | P23 | P33 | P43 | P53 | P63 | P73 |
| P04 | P14 | P24 | P34 | P44 | P54 | P64 | P74 |
| P05 | P15 | P25 | P35 | P45 | P55 | P65 | P75 |
| P06 | P16 | P26 | P36 | P46 | P56 | P66 | P76 |
| P07 | P17 | P27 | P37 | P47 | P57 | P67 | P77 |

FIG.11A Address values as column position information at time of reading from registers

|  | First byte | Second byte | Third byte | Fourth byte | Fifth byte | Sixth byte | Seventh byte | Eighth byte |
|---|---|---|---|---|---|---|---|---|
| First column | 0 | 1 | 2 | 3 | 4 | 5 | 6 | 7 |
| Second column | 7 | 0 | 1 | 2 | 3 | 4 | 5 | 6 |
| Third column | 6 | 7 | 0 | 1 | 2 | 3 | 4 | 5 |
| Fourth column | 5 | 6 | 7 | 0 | 1 | 2 | 3 | 4 |
| Fifth column | 4 | 5 | 6 | 7 | 0 | 1 | 2 | 3 |
| Sixth column | 3 | 4 | 5 | 6 | 7 | 0 | 1 | 2 |
| Seventh column | 2 | 3 | 4 | 5 | 6 | 7 | 0 | 1 |
| Eighth column | 1 | 2 | 3 | 4 | 5 | 6 | 7 | 0 |

FIG.11B Circular shift amounts at time of writing to registers

| First column | 0 byte |
|---|---|
| Second column | +1 byte |
| Third column | +2 bytes |
| Fourth column | +3 bytes |
| Fifth column | +4 bytes |
| Sixth column | +5 bytes |
| Seventh column | +6 bytes |
| Eighth column | +7 bytes |

FIG.11C Circular shift amounts at time of reading from registers

| First column | 0 byte |
|---|---|
| Second column | −1 byte |
| Third column | −2 bytes |
| Fourth column | −3 bytes |
| Fifth column | −4 bytes |
| Sixth column | −5 bytes |
| Seventh column | −6 bytes |
| Eighth column | −7 bytes |

FIG.16A Circular shift performed on input data
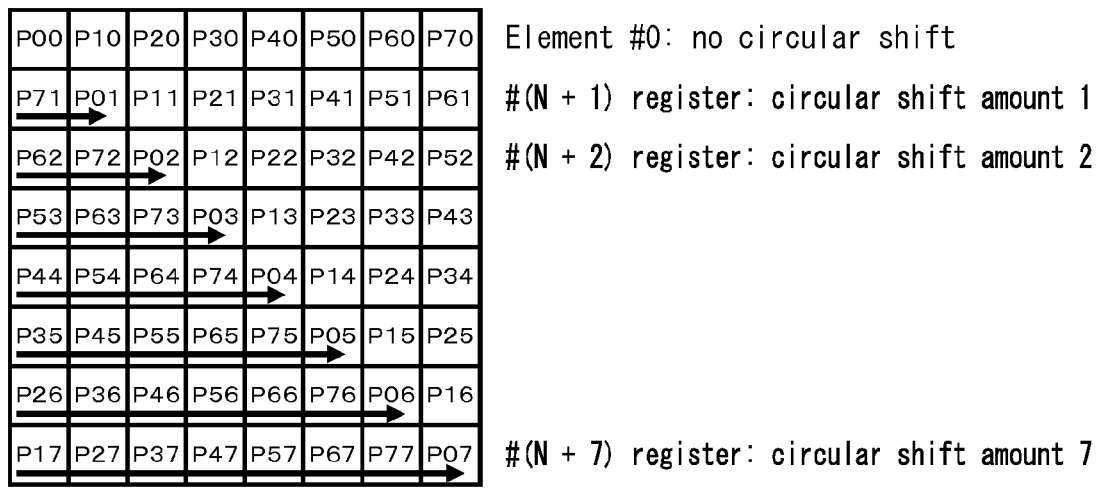
Element #0: no circular shift
(N + 1) register: circular shift amount 1
(N + 2) register: circular shift amount 2
(N + 7) register: circular shift amount 7
FIG.16B P*5 Offset-writing
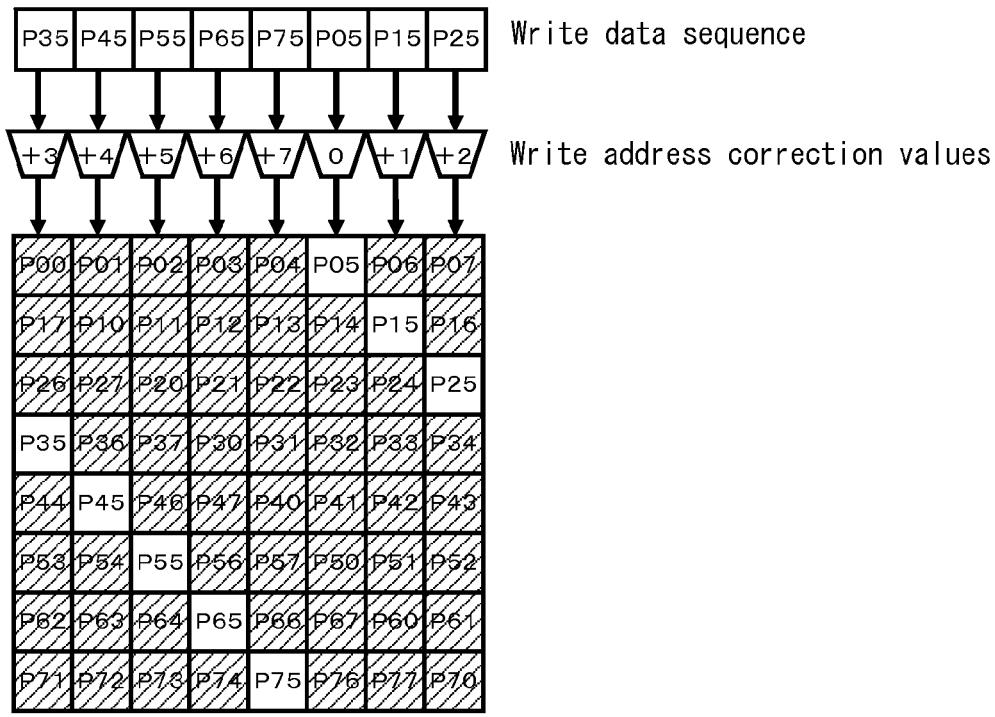

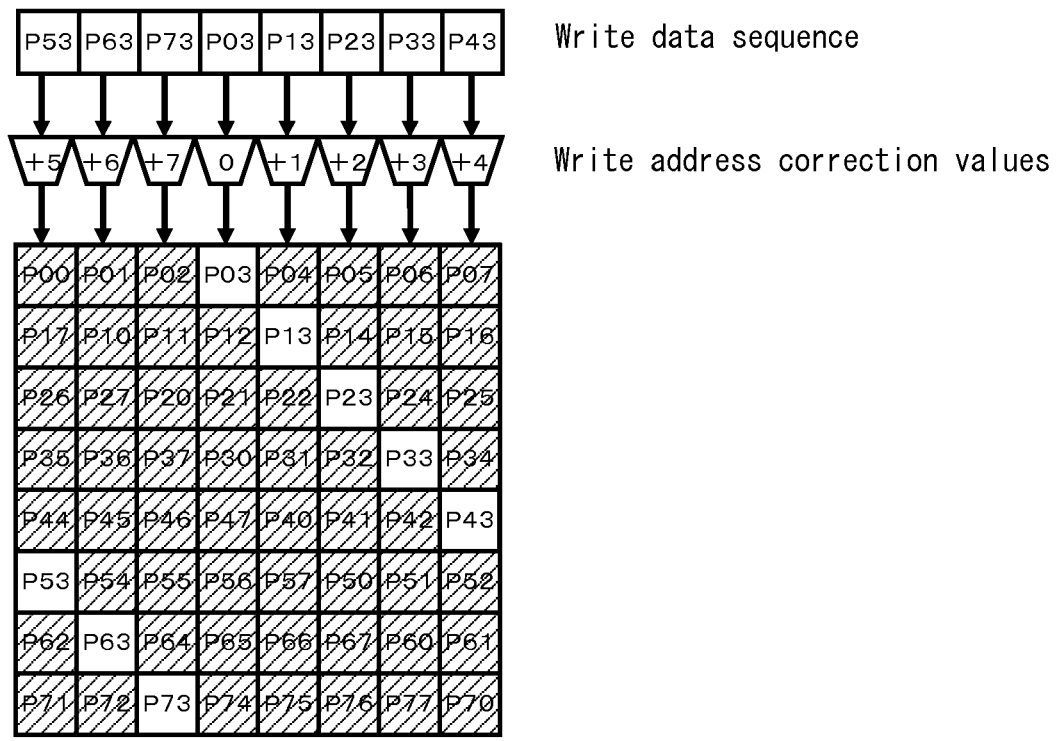
FIG.17C P*3 Offset-writing
FIG.17D Completion of writing

FIG.19A  Rearrangement performed on output data

| P00 | P01 | P02 | P03 | P04 | P05 | P06 | P07 |
|---|---|---|---|---|---|---|---|
| P16 | P10 | P11 | P14 | P13 | P12 | P17 | P15 |
| P25 | P27 | P20 | P21 | P22 | P23 | P24 | P26 |
| P37 | P36 | P33 | P30 | P31 | P34 | P35 | P32 |
| P44 | P45 | P46 | P47 | P40 | P41 | P42 | P43 |
| P53 | P52 | P55 | P56 | P57 | P50 | P51 | P54 |
| P62 | P63 | P64 | P65 | P66 | P67 | P60 | P61 |
| P71 | P74 | P77 | P72 | P75 | P76 | P73 | P70 |

N register
(N + 1) register
(N + 2) register

(N + 7) register

FIG.19B  P*2 Offset-reading

FIG.20

FIG.20C  Result of offset-reading

| P00 | P10 | P20 | P30 | P40 | P50 | P60 | P70 |
|-----|-----|-----|-----|-----|-----|-----|-----|
| P71 | P01 | P11 | P21 | P31 | P41 | P51 | P61 |
| P62 | P52 | P02 | P72 | P22 | P12 | P42 | P32 |
| P53 | P63 | P33 | P03 | P13 | P23 | P73 | P43 |
| P44 | P74 | P64 | P14 | P04 | P34 | P24 | P54 |
| P25 | P45 | P55 | P65 | P75 | P05 | P35 | P15 |
| P16 | P36 | P46 | P56 | P66 | P76 | P06 | P26 |
| P37 | P27 | P77 | P47 | P57 | P67 | P17 | P07 |

FIG.20D  Completion of rearrangement performed on input data

| P00 | P10 | P20 | P30 | P40 | P50 | P60 | P70 |
|-----|-----|-----|-----|-----|-----|-----|-----|
| P01 | P11 | P21 | P31 | P41 | P51 | P61 | P71 |
| P02 | P12 | P22 | P32 | P42 | P52 | P62 | P72 |
| P03 | P13 | P23 | P33 | P43 | P53 | P63 | P73 |
| P04 | P14 | P24 | P34 | P44 | P54 | P64 | P74 |
| P05 | P15 | P25 | P35 | P45 | P55 | P65 | P75 |
| P06 | P16 | P26 | P36 | P46 | P56 | P66 | P76 |
| P07 | P17 | P27 | P37 | P47 | P57 | P67 | P77 |

TRANSPOSITION OPERATION DEVICE, INTEGRATED CIRCUIT FOR THE SAME, AND TRANSPOSITION METHOD

TECHNICAL FIELD

The present invention relates to transposition operation technology for transposing a matrix.

BACKGROUND ART

As a processor for performing image processing at high speed, a parallel processor has been known. The parallel processor performs processing at high speed by performing similar operations to a plurality of elements constituting data simultaneously. In order for the processor to perform parallel processing as in filtering of rectangular image data and 2D orthogonal transformation, it may be necessary to transform data sequences by transposition.

A matrix of data is transposed by interchanging elements constituting the whole matrix so that the rows and columns of the matrix are interchanged. This method, however, has such a problem that the number of times an interchange instruction is executed increases significantly with an increasing number of elements constituting the matrix.

In order to perform transposition at high speed, a method using a matrix transposition device is known (see Patent Literature 1, for example).

CITATION LIST

Patent Literature

[Patent Literature 1]
Japanese Patent Application Publication No. 10-154140

SUMMARY OF INVENTION

Technical Problem

When the matrix transposition device disclosed in Patent Literature 1 is used separately from a processor, however, it becomes necessary to transfer a matrix of data between the matrix transposition device and the processor each time transposition is performed, adding to the time cost of transferring the matrix.

The present invention aims to provide a transposition operation device that reduces the time required for transposition.

Solution to Problem

The transposition operation device according to the present invention is a transposition operation device including: a register group configured to store therein a matrix of data as a target for operation and composed of a plurality of registers, each register being configured to store therein elements in a respective row of the matrix such that the elements are readable one at a time; a transposition control unit configured to generate output rearrangement information, column position information, and input rearrangement information for the matrix, the output rearrangement information being used to rearrange elements in each row of the matrix to generate a transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements; an output data rearrangement unit configured to generate the transformed matrix by using the output rearrangement information; a register access unit configured to (i) write the transformed matrix to the register group, and (ii) output the elements in the same column of the matrix by reading the transformed matrix from the register group and selecting, for each column of the transformed matrix, a different one of the registers by using the column position information; an input data rearrangement unit configured to rearrange the output elements by using the input rearrangement information; and an operation unit configured to perform an operation on the rearranged elements.

Advantageous Effects of Invention

According to the above-mentioned structure, the transposition operation device can reduce the time required for transposition.

BRIEF DESCRIPTION OF DRAWINGS

FIGS. 7A and 7B show rearrangement procedures for read data in Embodiment 1.

FIGS. 8C and 8D show rearrangement procedures for read data in Embodiment 1.

FIG. 9E shows rearrangement procedures for read data in Embodiment 1.

FIGS. 11A, 11B, and 11C show relationships between register addresses and column position information, and between register addresses and circular shift amounts used by a transposition control unit in Embodiment 2.

FIGS. 16A and 16B show rearrangement procedures for written data in Embodiment 4.

FIGS. 17C and 17D show rearrangement procedures for written data in Embodiment 4.

FIGS. 20C and 20D show rearrangement procedures for read data in Embodiment 5.

DESCRIPTION OF EMBODIMENTS (Background Leading to Invention)

A typical processor temporarily stores data as a target for operation in a storage area referred to as a register. The processor can read all the data stored in a single register upon one instruction. It is therefore desirable that data pieces to be processed in parallel be stored in separate registers included in a parallel processor.

The following describes a method for storing a matrix of data. For example, data representing a rectangular image is a matrix of data composed of elements corresponding to respective pixels (pixel values indicating color information and the like). Specifically, an upper left pixel of the image is an element (1, 1), and horizontally-aligned pixels are arranged in rows and vertically-aligned pixels are arranged in columns. When data having such a structure is stored in registers, the data is divided into data sequences each being composed of elements in a respective row, and the data sequences are stored in the respective registers. That is to say, horizontally-aligned pixels are stored in the same register, and vertically-aligned pixels are stored in different registers.

When a data sequence in a specific row of the matrix is read as in filtering of the horizontally-aligned pixels, the data sequence can be read as it is from a single register upon one instruction. When the matrix is read on a per-column basis as in filtering of the vertically-aligned pixels, however, it becomes necessary to read one element at a time from each of a plurality of registers storing therein the matrix as a whole. In this case, it is necessary to execute as many read instructions from registers as columns of the matrix.

As a method for a parallel processor efficiently handling the matrix on a per-column basis, transposition of the matrix is used. The rows and columns of the matrix are interchanged by the method, so that elements in a respective column of the matrix before transposition are stored in a single register and can be read upon one instruction.

As a method for transposing the matrix stored in the registers, there is a method for interchanging elements between registers as described above. With an increasing number of rows and columns of the matrix, i.e. an increasing number of elements, however, there is such a problem that the number of time an interchange instruction is executed increases significantly and a lot of processing time is required.

As a method for transposing a matrix, there is a method using a matrix transposition device as disclosed in Patent Literature 1.

Figure 21:
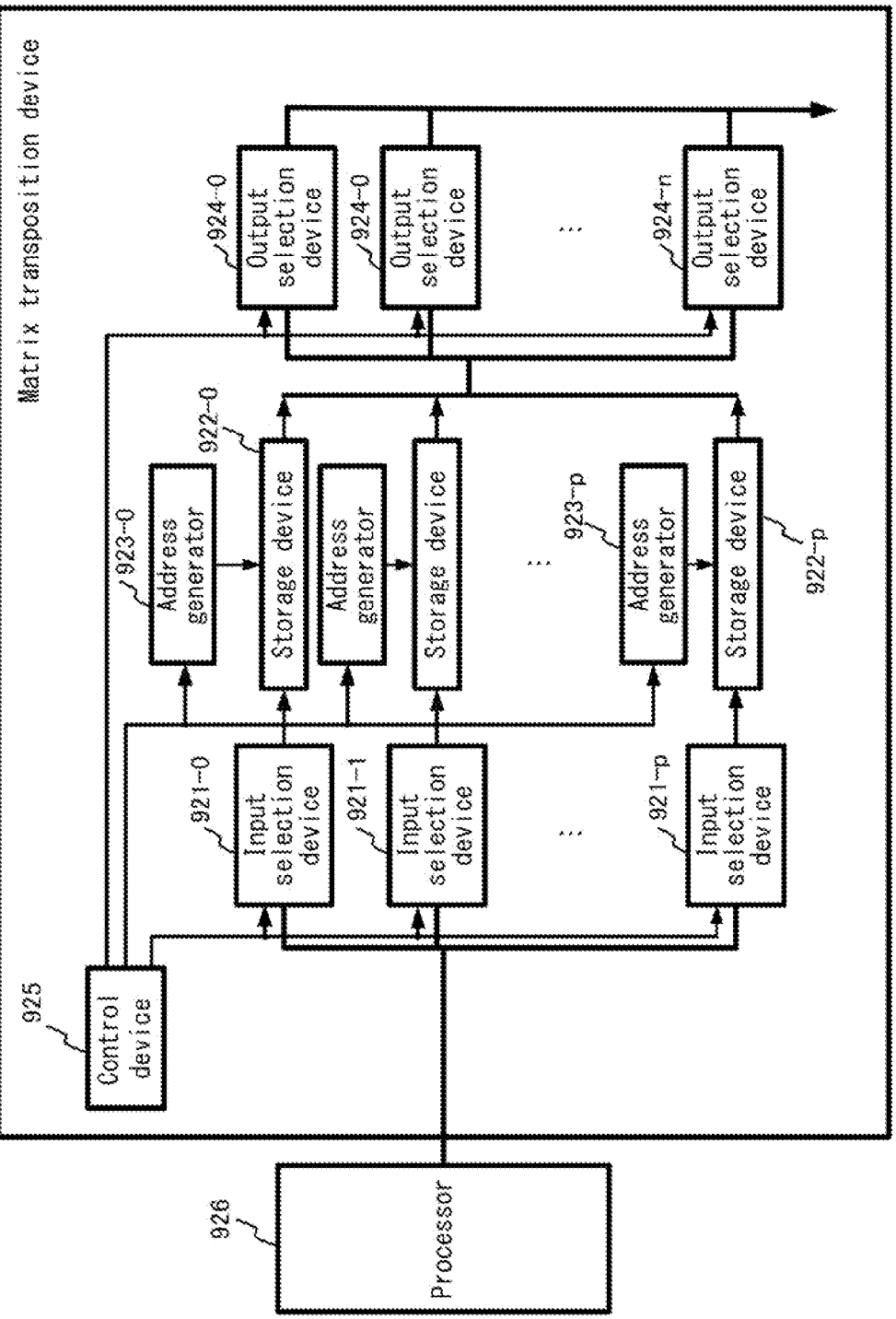
FIG. 21 is a block diagram illustrating the structure of a conventional matrix transposition device.

FIG. 21 illustrates the structure of a matrix transposition device 900 disclosed in Patent Literature 1. The matrix transposition device 900 includes input selection devices 921-0 to 921-*p*, storage devices 922-0 to 922-*p*, address generators 923-0 to 923-*p*, output selection devices 924-0 to 924-*n*, and a control device 925. Further, in FIG. 21, a processor 926 is illustrated. A storage device 922-I (I is an integer equal to or greater than 0 and equal to or smaller than p) includes, for example, single-input and single-output RAM and has storage areas that can be designated by respective addresses generated by an address generator 923-I.

The control device 925 controls the input selection device 921-I and the address generator 923-I so that, when a matrix of data is stored, elements in a given row are stored in different storage devices 922-I. The control device 925 further controls an output selection device 924-J (J is an integer equal to or greater than 0 and equal to or smaller than n) and the address generator 923-I so that, when the matrix is read, elements in a given column of a transposed matrix of data are output while maintaining a determined order and an order of elements in the determined column.

When the processor uses the matrix transposition device disclosed in Patent Literature 1, however, there are the following two problems.

When the matrix transposition device is provided outside the processor, there is a standby time during which the processor cannot perform any processing. That is to say, when transposition is performed, the processor has to output a matrix of data to the matrix transposition device, and then has to read a transposed matrix of data from the matrix transposition device. At least during a time period from completion of output of data in the Ith column of the matrix to completion of storage of data in the Ith row of the transposed matrix in a register, the processor cannot perform processing on the data in the Ith column of the matrix before transposition (the data in the Ith row of the transposed matrix).

On the other hand, when the matrix transposition device is provided in the processor, the following problem occurs. In order to transpose a matrix of data of N (N is an integer equal to or larger than two) rows and columns, the matrix transposition device disclosed in Patent Literature 1 requires N storage devices that can individually input/output data. Therefore, in a case of an image processor for transposing a block of 8×8 pixels, for example, eight storage devices that can individually input/output data are necessary, leading to an increase in cost. Attempts to implement the matrix transposition device with a processor and software by using a single storage device can result in failure to transpose a matrix at high speed. This is because it becomes necessary to input data in each column of a matrix on a per-element basis and to output data in each column of a transposed matrix on a per-element basis, rather than on a per-column basis.

The inventors conceived ideas of: a method for storing a matrix of data in a register group by which data in each row of a matrix before transposition is stored upon one instruction and data in each row of a transposed matrix is also read upon one instruction; and a method for transposing a matrix only by performing the storing and reading of the matrix in and from the register group. That is to say, when a result of an operation to output a matrix of data as a target for transposition is stored in registers, the matrix is stored in a register group after elements in each row of the matrix are rearranged to generate a transformed matrix so that elements in the same column of the matrix before transposition are in different columns of the transformed matrix. When input data of an operation requiring the transposed matrix is read from the registers, data in each row of the transformed matrix is read by reading one element from each of the registers so that the order of the element to be read does not overlap between registers. For example, the first, second, and third elements are read from different registers (reading in the above-mentioned manner is performed upon one instruction). Finally, the read elements in each row of the transformed matrix are rearranged to be in the order of the elements in a corresponding column, and the operation requiring the transposed matrix is then performed.

According to this structure, when a matrix of data as a result of an operation 1 is transposed to be used in an operation 2, an instruction to store the result of the operation 1 in registers and an instruction to read a target of the operation 2 from the registers should respectively be replaced with a store instruction and a read instruction for transposition. That is, since matrix is transposed by performing the reading/writing of the matrix from/to the registers, there is no need to store a matrix as a target for transposition in the registers, and then an operator included in the processor executes a transpose instruction. Furthermore, since data is read from the registers, the operator included in the processor can directly use the read data in each row of the transposed matrix. This eliminates the need to store the data in each row of the transposed matrix in a register to perform another operation. This can reduce the time required to transpose a matrix.

EMBODIMENTS

The following describes embodiments of the present invention with reference to the drawings.

Embodiment 1

The structure of an image processing apparatus 100 including a transposition operation device 200 according to Embodiment 1 is described first.

Figure 2:
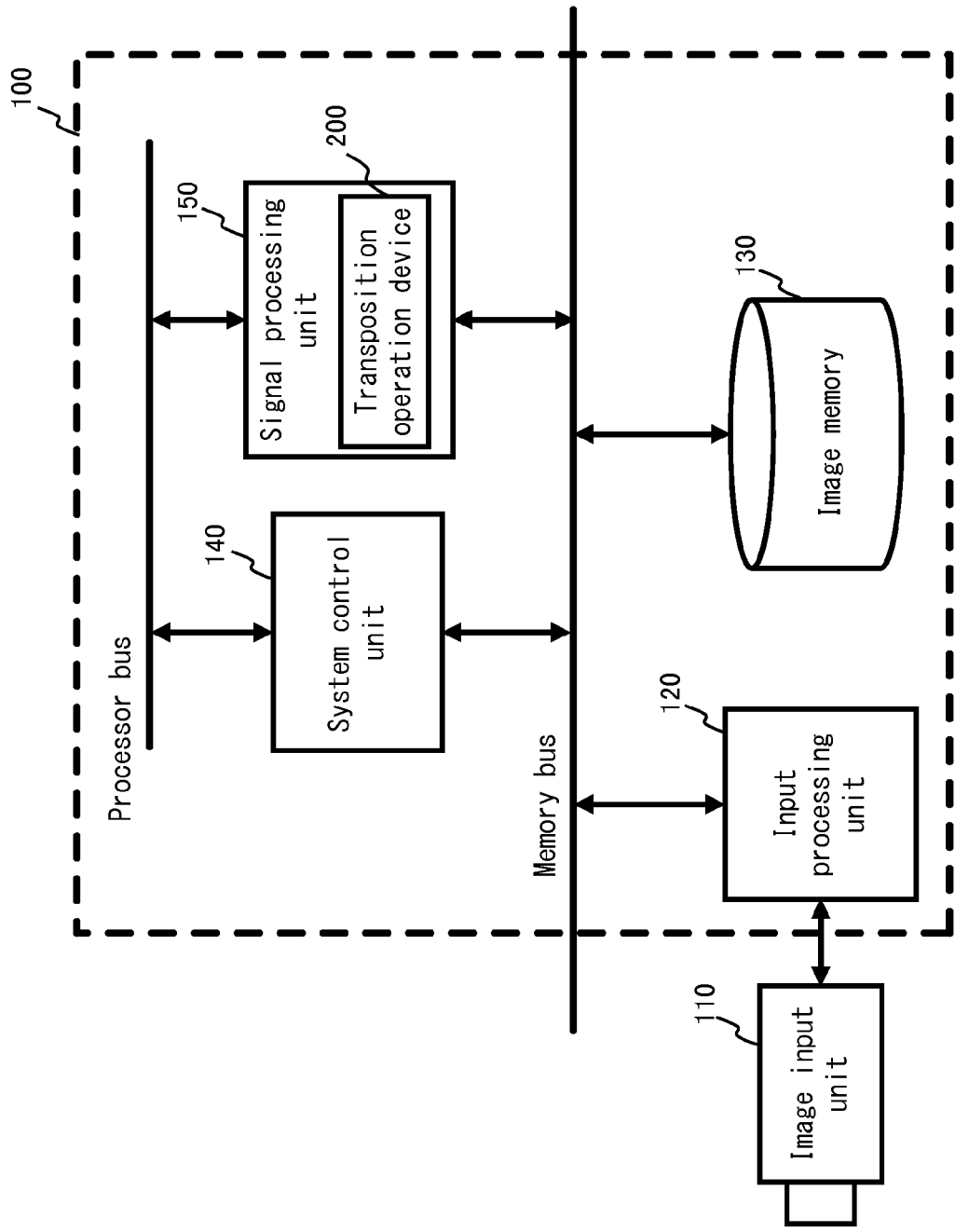
FIG. 2 is a block diagram illustrating an example of the structure of an image processing apparatus including the transposition operation device in Embodiment 1.

FIG. 2 is a functional block diagram showing the image processing apparatus 100. The image processing apparatus 100 includes an image input unit 110, an input processing unit 120, image memory 130, a system control unit 140, and a signal processing unit 150. The transposition operation device 200 is a part of the signal processing unit 150.

The image input unit 110 acquires an image at a constant frame rate to generate image data having a certain size, and transmits the generated image data to the input processing unit 120.

The input processing unit 120 transfers the image data received from the image input unit 110 to the image memory 130. Upon completion of the transfer of the image data, the input processing unit 120 notifies the system control unit 140 accordingly.

The image memory 130 stores therein the image data transferred from the input processing unit 120 and a result of image processing performed by the signal processing unit 150.

The system control unit 140 performs entire control over the image processing apparatus 100, and provides operation setting for each block within the apparatus.

The signal processing unit 150 is a block for performing signal processing on the image data input from the image memory 130. An operation including transposition is performed by the transposition operation device 200.

Parameter settings for and execution control over the system control unit 140, the signal processing unit 150, and the transposition operation device 200 are performed via a processor bus. An access to the image memory 130 from other components, including transmission/reception of an input image and image data to be processed, is performed via a memory bus.

<Transposition Operation Device>

Figure 1:
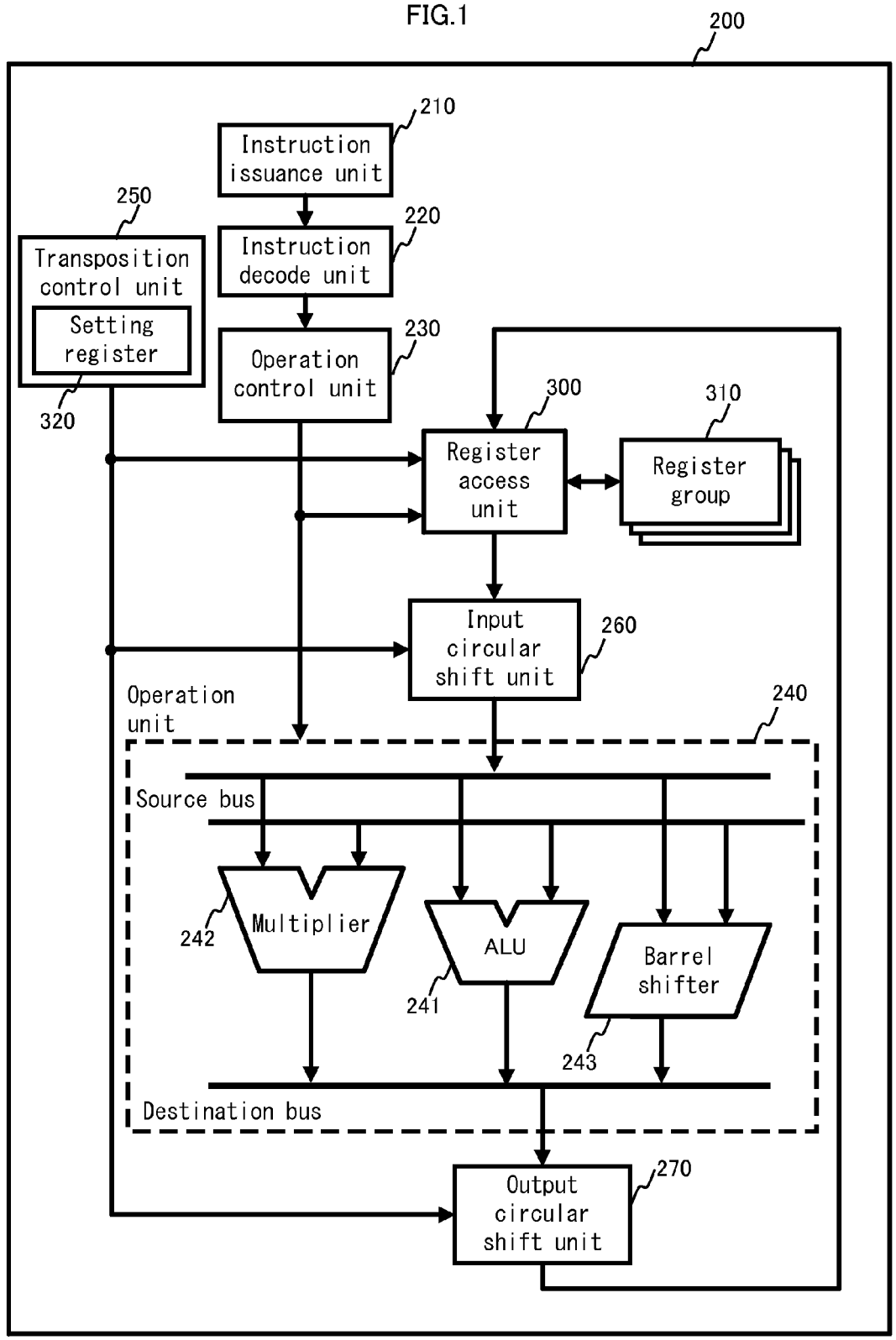
FIG. 1 is a block diagram illustrating an example of the structure of a transposition operation device in Embodiment 1.

FIG. 1 is a block diagram illustrating the transposition operation device 200 according to Embodiment 1. The transposition operation device 200 includes an instruction issuance unit 210, an instruction decode unit 220, an operation control unit 230, an operation unit 240, a transposition control unit 250, an input circular shift unit 260, an output circular shift unit 270, a register access unit 300, and a register group 310.

The instruction issuance unit 210 receives an operation instruction for a parallel processor to be executed by the transposition operation device 200 from the signal processing unit 150, and issues the received operation instruction to the instruction decode unit 220.

Upon receiving the operation instruction, the instruction decode unit 220 decodes information on register access and an operation from an instruction code, and transmits information on a data path required to execute the instruction to the operation control unit 230. The instruction decode unit 220 also outputs, to the operation control unit 230, information on whether transposition is necessary or not after performing the operation.

The register group 310 is a device for storing therein a matrix of data as a target for operation and transposition. The register group 310 is composed of a plurality of registers each having a unique address.

Hereinafter, a range of a storage area of a register having the same register address is referred to as one register. The matrix is stored in the register group 310 such that data sequences in respective rows of the matrix are stored in registers having different addresses.

Figure 3:
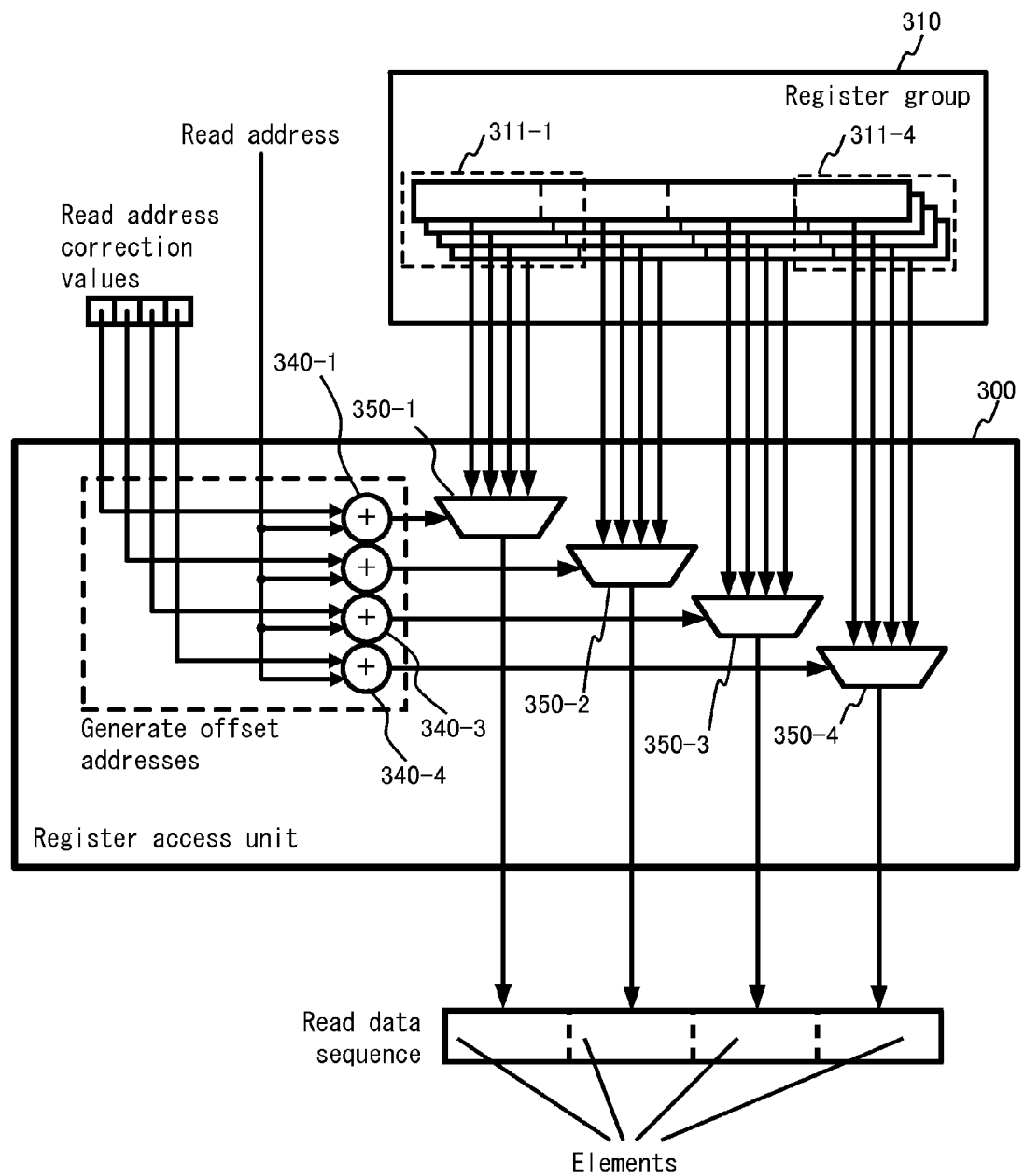
FIG. 3 is a block diagram illustrating an example of the structure of a register access unit in Embodiment 1.

The register access unit 300 reads/writes data from/to the register group 310. FIG. 3 illustrates the structure of the register access unit 300. The register access unit 300 includes selectors 350-1 to 350-4. Each of the selectors 350-1 to 350-4 receives elements from registers constituting the register group 310, selects one of the elements, and outputs the selected element. The element refers to a minimum component of the matrix. When image data of 4×4 pixels represents a matrix of data of four rows and columns, the element refers to data of one pixel.

When receiving a read instruction from the operation control unit 230 along with designation of an address, and not receiving column position information from the transposition control unit 250, the register access unit 300 reads a data sequence stored in one of the registers constituting the register group 310 having the designated address, and transmits the read data sequence to the input circular shift unit 260.

When receiving a read instruction from the operation control unit 230 along with designation of an address, and receiving designation of address correction values as the column position information from the transposition control unit 250, the register access unit 300 generates offset addresses from the designated address and the address correction values, reads a data sequence while changing a register from which each element is read as described below, and transmits the read data sequence to the input circular shift unit 260. Hereinafter, processing to read the data sequence, one element at a time, by using the column position information is referred to as offset-reading.

The address correction values are the column position information used to read elements in a specific column of a matrix of data stored in the register group 310 by designating an element to be read. The address correction values represent difference values between the address designated by the operation control unit 230 and respective addresses of registers from which the first, second, . . . elements are read. The following describes details of the address correction values.

When the address correction values are designated, the register access unit 300 read data as described below. The register access unit 300 first adds the respective address correction values to the address (read address) designated by the operation control unit 230 by using adders 340-1 to 340-4 to generate offset addresses. Then, an offset address having been generated by adding, to the read address, an address correction value corresponding to the first element is output from the adder 340-1 to the selector 350-1. The selector 350-1 selects, from an area 311-1 of the register group 310 in which the first elements in the respective registers are stored, a register indicated by the offset address, and acquires an element from the selected register. Similarly, the selector 350-2 acquires, from the adder 340-2, an offset address having been generated by adding, to the read address, an address correction value corresponding to the second element. The selector 350-2 then selects, from an area 311-2 of the register group 310 in which the second elements in the respective registers are stored, a register indicated by the offset address, and acquires an element from the selected register. Elements corresponding to the respective offset addresses are read in a similar manner.

The selector 350-1 acquires the element from the area 311-1 of the register group 310 in which the first elements in the respective registers are stored. The selector 350-2 acquires the element from the area 311-2 of the register group 310 in which the second elements in the respective registers are stored. The register access unit 300 can therefore simultaneously acquire elements from the area 311-1 of the register group 310 in which the first elements in the respective registers are stored, the area 311-2 of the register group 310 in which the second elements in the respective registers are stored, the area 311-3 of the register group 310 in which the third elements in the respective registers are stored, and the area 311-4 of the register group 310 in which the fourth elements in the respective registers are stored. The elements thus read are output from the register access unit 300 to the input circular shift unit 260 as a data sequence in which an output of the selector 350-1, an output of the selector 350-2, an output of the selector 350-3, and an output of the selector 350-4 are arranged in this order. Since each of the selectors cannot output two or more elements simultaneously, it is not possible to read the first element stored in a register with an address #1 and the first element stored in a register with an address #2 by one read operation.

When receiving a write instruction from the operation control unit 230 along with designation of an address, the register access unit 300 writes a data sequence received from the output circular shift unit 270 into one of the registers constituting the register group 310 having the designated address.

The input circular shift unit 260 rearranges elements constituting the data sequence read by the register access unit 300 from the register group 310 by circular shift. The circular shift means bit shift performed as if the right and left ends of a data sequence were connected to each other. Specifically, an element shifted, by bit shift, out of the data sequence at the right end is shifted in the data sequence from the left end. Similarly, an element shifted, by bit shift, out of the data sequence at the left end is shifted in the data sequence from the right end. For example, a data sequence generated by circular-shifting a data sequence {a, b, c, d, e, f} (each of a, b, c, d, e, and f represents a one-bit element) to the right by one bit is a data sequence {f, a, b, c, d, e}. A data sequence generated by further circular-shifting the data sequence {f, a, b, c, d, e} to the left by two bits is a data sequence {b, c, d, e, f, a}.

The number of bits by which a data sequence is circular-shifted to the right or left is determined by a circular shift amount designated by the transposition control unit 250.

Hereinafter, an amount of right shift is indicated by a positive value, and an amount of left shift is indicated by a negative value. In the present embodiment, a bit width of each element is equal to a shift unit. For example, when the bit width of each element is eight bits, a shift amount +2 indicates right circular shift by 16 bits, and a shift amount −5 indicates left circular shift by 40 bits.

A data sequence resulting from the rearrangement by the input circular shift unit 260 is passed to the operation unit 240 as input data.

The operation unit 240 includes an ALU (Arithmetic Logic Unit) 241, a multiplier 242, and a barrel shifter 243 for performing an arithmetic operation and a logic operation. These operators perform operations on a plurality of elements in parallel.

The operation unit 240 provides, as source data, the data sequence resulting from the rearrangement by the input circular shift unit 260 for each operator via an independent source bus. Processing performed by each operator is determined based on an operation instruction specified by the operation control unit 230, and a result of the operation is output to the output circular shift unit 270 via a destination bus.

The output circular shift unit 270 rearranges elements constituting a data sequence as the result of the operation performed by the operation unit 240 by circular shift. As in the input circular shift unit 260, the circular shift amount is determined by the transposition control unit 250. The data sequence resulting from the rearrangement is output to the register access unit 300. Details of the circular shift and the shift amount are the same as those in the case of the input circular shift unit 260. Description thereof is thus omitted.

The operation control unit 230 generates data path information for performing operations from operation instructions executed sequentially. The data path information is generated based on a signal received from the instruction decode unit 220, and is information for selecting a function of an operation instruction to be executed, an address of a register from/to which data is read/written, effective source and destination buses, and the like. When the result of the operation is required to be transposed, the operation control unit 230 outputs, before output of the result of the operation, setting information required by the transposition control unit 250 to perform transposition, such as an address of a register to which data is written, to a setting register 320 included in the transposition control unit 250. The setting register 320 stores therein the setting information.

When the setting information is stored in the setting register 320, the transposition control unit 250 performs transposition control when a matrix of data is written to the register group 310 in the operation and the matrix is read from the register group 310 in the subsequent operation using data that is a transpose of the result of the operation. When the setting information is not stored in the setting register 320, the transposition control unit 250 does not perform transposition control over data written to the register group 310 and data read from the register group 310. As described later, neither the output circular shift unit 270 nor the input circular shift unit 260 circular-shifts a matrix of data, and the register access unit 300 accesses the register group 310 by only using an address designated by the operation control unit 230.

Figure 4:
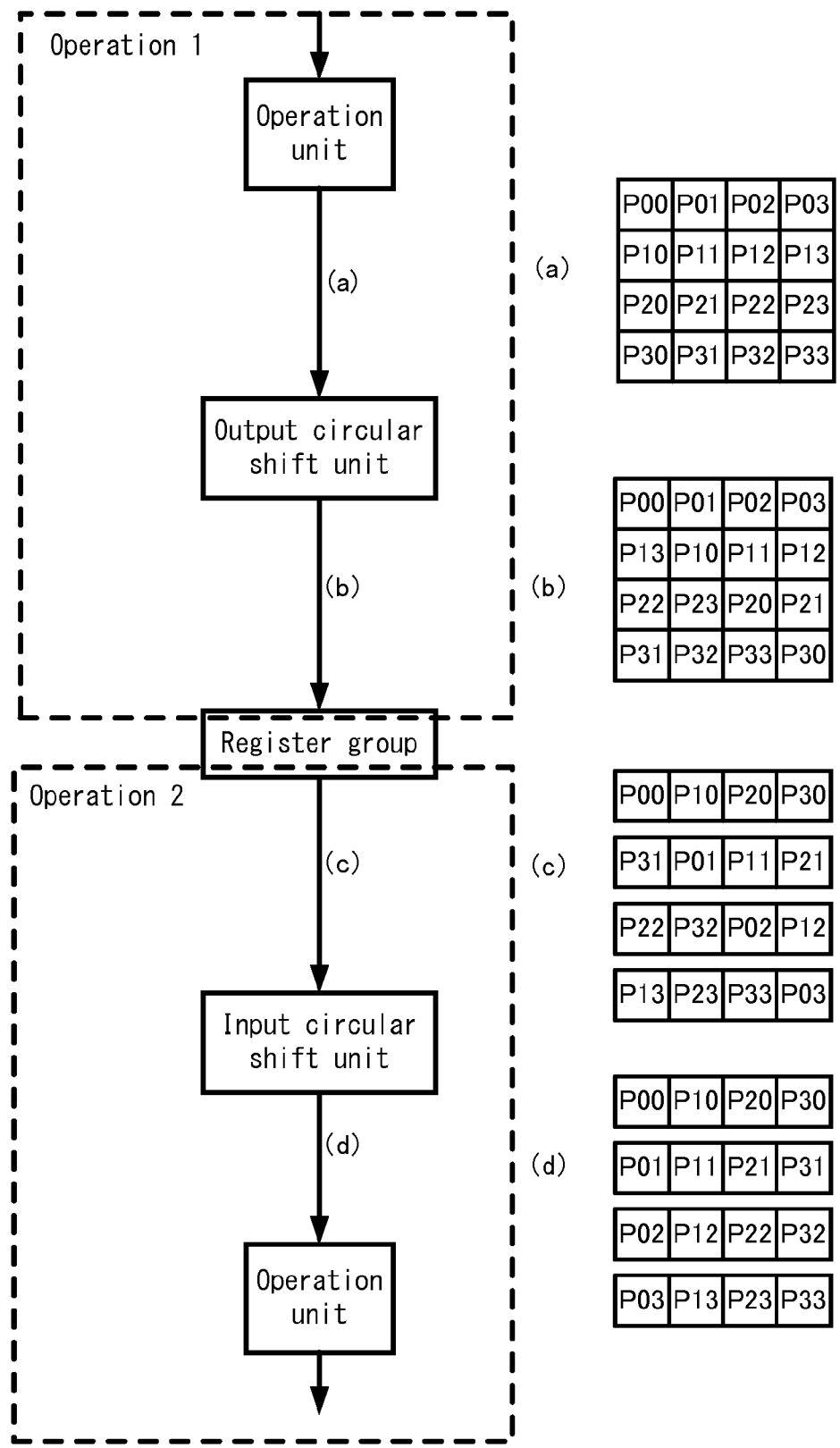
FIG. 4 illustrates images of a stored matrix of data pertaining to transposition in Embodiment 1.

Transposition performed by the transposition operation device 200 and transposition control performed by the transposition control unit 250 are described with use of FIG. 4. When attempting to perform an operation 2 on a transposed matrix of data generated by transposing a result of an operation 1, the transposition operation device 200 performs the following processing.

When the operation 1 is performed, the transposition operation device 200 performs an operation as normal (a result of the operation is shown in FIG. 4(*a*)). The transposition operation device 200 then circular-shifts the result of the operation by using the output circular shift unit 270 as described above (FIG. 4(b)), and stores the circular-shifted matrix in the register group 310 by using the register access unit 300. The transposition control unit 250 notifies the output circular shift unit 270 of values of the circular shift amount that increases by one with an increasing row number. For example, the circular shift amount for the first row of the matrix is 0, and the circular shift amount for the second row of the matrix is +1. As a result, elements in the first column of the matrix are shifted to be in different columns. For example, the elements in the first column of the matrix are shifted to be composed of the first element in the first row and the second element in the second row . . . .

When the data is read from the registers in the operation 2, the transposition operation device 200 performs the above-mentioned offset-reading and the circular shift by using the input circular shift unit 260, and outputs a data sequence resulting from the circular shift to the operation unit 240 (FIG. 4(c)). The transposition control unit 250 notifies the register access unit 300 of address correction values that increase by one, from a reference element, with an increasing element number. For example, the address correction values for the first and second elements are respectively specified as 0 and +1. With this structure, the elements having been in the first column of the matrix that are shifted to be in different columns can be read at one time, for example, by reading the first element from a register for storing therein data in the first row, and reading the second element from a register storing therein data in the second row.

In order to read elements having been in the second column, for example, the register access unit 300 reads the second element from the register storing therein data in the first row, and the third element from the register storing therein data in the second row. As a result, a data sequence obtained by circular-shifting the elements having been in the second column of the matrix to the right by one is read. For example, an element having been in the first row and second column of the matrix is the second element of the read data sequence, and an element having been in the second row and second column of the matrix is the third element of the read data sequence. In order to bring the read data sequence to data in the second row of a transposed matrix whose first element is the element in the first row and second column of the matrix, the transposition control unit 250 notifies the input circular shift unit 260 of the circular shift amount −1, which has the same absolute value as the circular shift amount +1 used for the second row of the matrix by the output circular shift unit 270 and has an opposite sign to the circular shift amount +1.

By performing the above-mentioned processing, when performing the operation 2, the operation unit 240 can receive, as an input, a transpose of the result of the operation 1 (FIG. 4(d)).

As described above, by performing the circular shift and the offset-reading in the processing to read data from the register group 310 pertaining to an operation performed after transposition and in the processing to write data to the register group 310 pertaining to an operation to output the data, the transposition control unit 250 can perform transposition without causing the operation unit 240 to perform transposition. The transposition control unit 250 generates the circular shift amounts used by the output circular shift unit 270 (referred to as output circular shift amounts), the address correction values used in the offset-reading, and the circular shift amounts used by the input circular shift unit 260 (referred to as input circular shift amounts) required for transposition as described above, and stores the generated information pieces in the setting register 320 included therein. The input circular shift unit 260 and the output circular shift unit 270 acquire the circular shift amounts from the setting register 320, and the register access unit 300 acquires the address correction values from the setting register 320.

Examples of setting the circular shift amounts and the address correction values, and detailed setting are described later.

<Operation>

The following describes transposition procedures, performed by the transposition operation device 200, relating to image processing on a matrix of image data of eight rows and columns.

Figure 5:
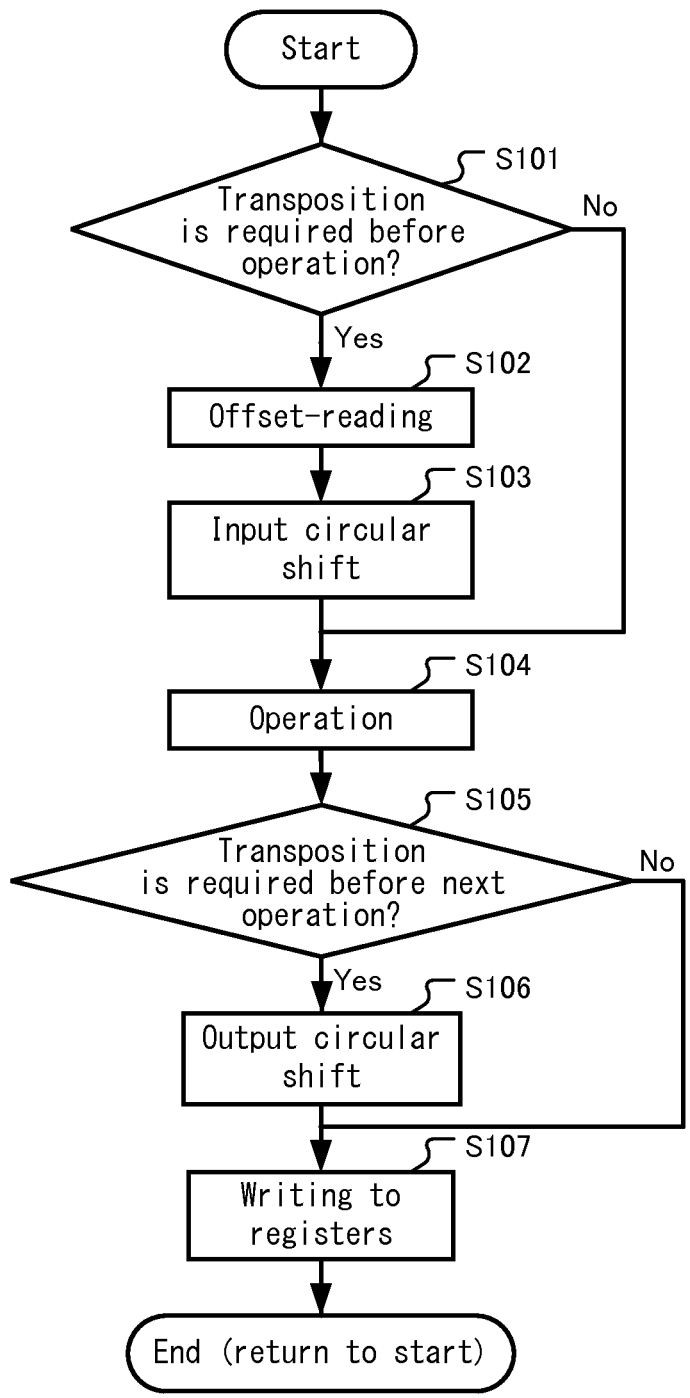
FIG. 5 is a flow chart showing processing performed by the transposition operation device in Embodiment 1.

FIG. 5 is a flow chart showing processing performed when the transposition operation device 200 according to Embodiment 1 executes one operation instruction.

Figure 6:
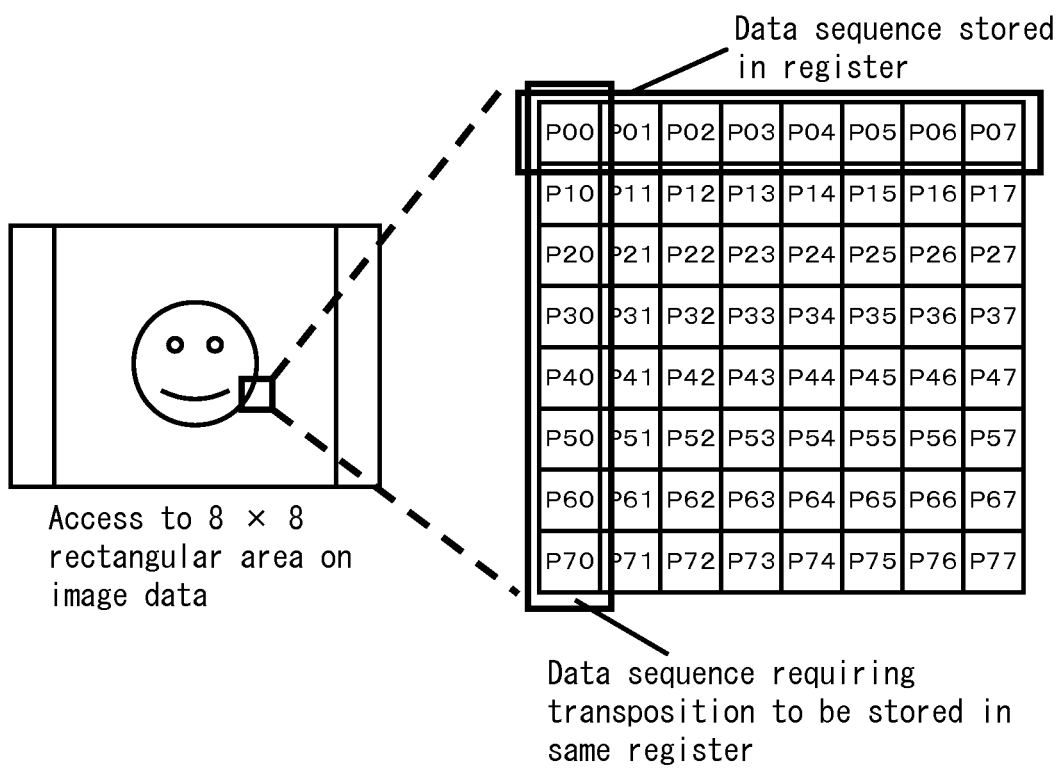
FIG. 6 illustrates how to store image data in registers by access to a rectangular area on the image data in Embodiment 1.

FIG. 6 illustrates a set of data sequences arranged in eight columns. Each of the data sequences is composed of eight elements.

Suppose that a matrix of data composed of elements P00 to P77 arranged in eight rows and columns illustrated in FIG. 6 is output data of the operation 1 and is input data of the operation 2. As described above, when the matrix is stored in the register group 310, the elements P00 to P07 in the first row are stored in one register, the elements P10 to P17 in the second row are stored in another register, and the elements P20 to P27 in the third row are stored in yet another register. In this case, when the transposition operation device 200 attempts to perform an operation on a data sequence composed of the elements P00 to P70 (the data sequence in the first column of the matrix illustrated in FIG. 6), it becomes necessary to perform reading eight times, because the elements are stored in registers having different addresses and an order of each element in a corresponding register is the same so that the elements cannot be read simultaneously. In order to efficiently perform an operation on a parallel processor, transposition becomes necessary. The operation control unit 230 instructs the transposition control unit 250 to perform transposition on an output of the operation 1 by outputting the setting information to the setting register 320 (Yes in S105), and the transposition control unit 250 performs transposition in the following manner.

In order to store image data in the register group 310, the transposition control unit 250 provides setting of the output circular shift amounts for the setting register 320. The output circular shift unit 270 performs circular shift based on the output circular shift amounts. The transposition control unit 250 notifies the output circular shift unit 270 of the circular shift amounts that increase by one with an increasing row number, and the output circular shift unit 270 performs circular shift accordingly (S106). For example, the circular shift amount for the elements P00 to P07 is 0, the circular shift amount for the elements P10 to P17 is +1, and the circular shift amount for the elements P20 to P27 is +2.

The output circular shift unit 270 outputs data sequences resulting from the circular shift to the register access unit 300. The register access unit 300 stores the elements P00 to P07 in a register having a register address N, the elements P10 to P17 in a register having a register address (N+1), and the elements P20 to P27 in a register having a register address (N+2), as designated by the operation control unit 230 (S107). FIG. 7A illustrates a state where all the data sequences are stored. The state where the data sequences resulting from the circular shift by the output circular shift unit 270 are stored in the register group 310 is referred to as a transposition prepared state.

Transposition in the operation 1 is completed with the storage of the data sequences in the register group 310. Steps performed before the operation (S101 to S104) depend on whether a matrix as input data of the operation 1 is required to be transposed or not. Description thereof is thus omitted.

The following describes transposition in the operation 2.

When the operation 2 includes transposition (Yes in S101), the transposition control unit 250 generates the address correction value for each column of the matrix before transposition when the input data composed of the elements P00 to P77 is read from the register group 310. The register access unit 300 performs offset-reading by using a register address N designated by the operation control unit 230 and the address correction value, and outputs a data sequence in each column of the matrix before transposition (S102).

The following describes a method for generating the address correction values. For example, as shown in FIG. 7B, when the data sequence composed of the elements P00 to P70 in the first column of the matrix before transposition is read, the address correction values for the first, second, and third elements are respectively set to 0, +1, and +2. The address correction values for the elements P00 to P70 are set to {0, +1, +2, +3, +4, +5, +6, +7}.

The register access unit 300 generates the data sequence by reading data from the register group 310 in the following manner. Since the correction value for the first element is 0, the first element P00 in the designated #N register is read. Since the correction value for the second element is +1, the second element P10 in a #(N+1) register, whose address is obtained by adding the correction value +1 to the address N, is read. By reading the third to eighth elements in a similar manner, the data sequence composed of the elements P00 to P70 is read.

In order to change a column as a target for reading, the transposition control unit 250 changes a reference element, and generates the address correction value for read access that increases by one from the reference element. The reference element refers to an element that is stored in a register having an address designated by the operation control unit 230 (an element for which the address correction value is set to 0), and is in a column as a target for reading. For example, when elements in the second column are to be read, the reference element is the element P01. When the reference element is not the first element, a value obtained by adding one to the address correction value for the last element is set as the address correction value for the first element. FIG. 8C shows an example in which the address correction value for the second element is set to 0. In this case, the address correction values are {+7, 0, +1, +2, +3, +4, +5, +6}. As described above, as the first element, the first element P71 in a #(N+7) register, whose address is obtained by adding the correction value +7 to the address N, is read. By reading the second to eighth elements in a similar manner, the data sequence composed of the elements P01 to P71 is read. Similarly, when the data sequence composed of the elements P07 to P77 is read as shown in FIG. 8D, for example, the address correction value for the eighth element is set to 0, and the address correction values for the elements P07 to P77 are set to {+1, +2, +3, +4, +5, +6, +7, 0}. By repeating the offset-reading while changing a position of the reference element by one, the matrix of data stored in the registers is read such that data sequences in respective columns of the matrix before transposition are read one at a time.

Finally, the transposition control unit 250 notifies the input circular shift unit 260 of the circular shift amount having the same absolute value as the circular shift amount used to bring the matrix before transposition to the transposition prepared state and having an opposite sign to the circular shift amount used to bring the matrix before transposition to the transposition prepared state. The input circular shift unit 260 performs circular shift as shown in FIG. 9E, so that input data for the operation unit 240 becomes equivalent to a transpose of the image data of eight rows and columns (S103).

By the above-mentioned processing, the operation unit 240 receives, as an input, a transpose of the matrix stored in the register group 310 without executing an operation instruction to perform transposition (S104).

Transposition in the operation 2 is completed with the output of the transpose to the operation unit 240. Since steps performed after the operation (S105 to S107) depend on whether output data is required to be transposed or not and are similar to the above-mentioned transposition performed in the operation 1, description thereof is omitted.

The following describes a case where a result of the operation 1 is used as an input of the operation 2 without being transposed.

In the operation 1, the transposition control unit 250 does not notify the output circular shift unit 270 of the circular shift amount. The output circular shift unit 270 outputs data sequences received from the operation unit 240 to the register access unit 300 without performing circular shift (No in S105). As illustrated in FIG. 6, the register access unit 300 stores the matrix of data in the register group 310 such that the elements P00 to P07 are stored in the register having the register address N, and the elements P10 to P17 are stored in the register having the register address (N+1), as designated by the operation control unit 230 (S107).

In the operation 2, the transposition control unit 250 does not specify the address correction values and the circular shift amounts. The register access unit 300 reads the data sequence composed of the elements P00 to P07 from the register having the register address N, and reads the data sequence composed of the elements P10 to P17 from the register having the register address (N+1), as designated by the operation control unit 230. The input circular shift unit 260 outputs the data sequences input from the register access unit 300 to the operation unit 240 without performing circular shift (No in S101).

When the result of the operation after transposition is used as it is, the transposition operation device 200 should use the result as an input of the next operation. On the other hand, when the result is restored to an original state, the transposition operation device 200 should transpose the result again.

According to this structure, only by instructing the transposition control unit 250 to perform transposition in the transposition operation device 200, transposition can be divided into processing performed in (i) processing, in an operation to output data required to be transposed, to write the output data from the operation unit 240 to the register group 310 and processing performed in (ii) processing, in an operation using the data required to be transposed as an input, to read the data from the register group 310 and provide the read data for the operation unit 240 as an input. In particular, if writing to the register group 310 is completed, data in each row of a transposed matrix can be output to the operation unit 240 by performing the offset-reading and the circular shift. It is therefore possible to perform operations in parallel while outputting the entire transposed matrix, for example, leading to an increase in speed of image processing including transposition.

Embodiment 2

Figure 10:
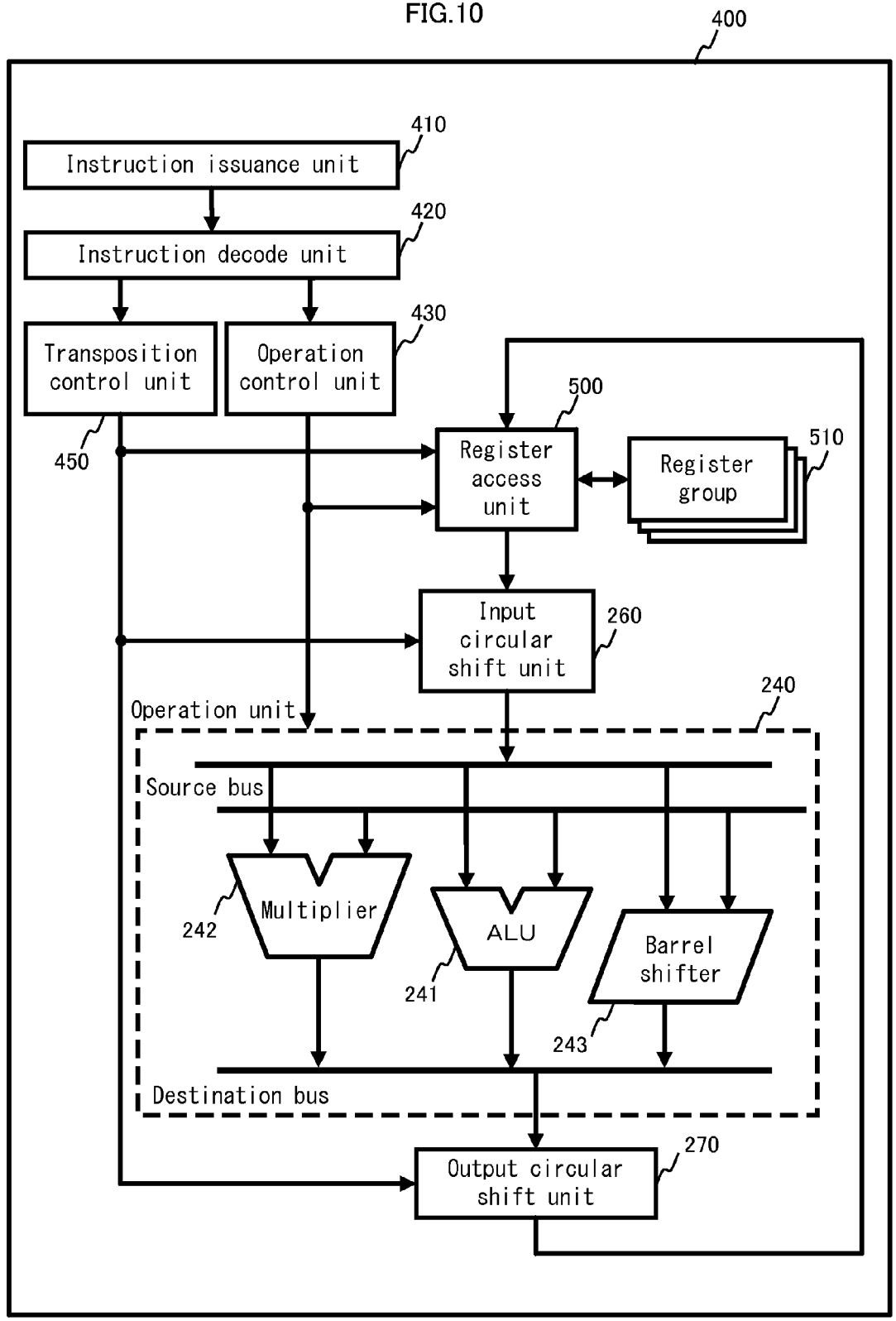
FIG. 10 is a block diagram illustrating an example of the structure of a transposition operation device in Embodiment 2.

FIG. 10 is a block diagram illustrating a transposition operation device 400 in Embodiment 2. In FIG. 10, components that are the same as those in FIG. 1 are assigned with the same reference signs as those in FIG. 1, and description thereof is omitted.

The register group includes a transposition register group 510, which is a group of dedicated registers for storing therein data sequences pertaining to transposition. In the present embodiment, registers assigned with register numbers 0 to 7 are the transposition register group as a whole. Hereinafter, a register belonging to the transposition register group 510 and having a unique address is referred to as a transposition register.

The transposition operation device 400 includes an instruction issuance unit 410, an instruction decode unit 420, an operation control unit 430, the operation unit 240, a transposition control unit 450, a register access unit 500, and the transposition register group 510.

The transposition control unit 450 does not include therein a register for setting the column position information and the circular shift amounts, and receives a control parameter from the instruction decode unit 420.

The register access unit 500 reads/writes data from/to the register group including the transposition register group 510. Details thereof are described later.

The instruction issuance unit 410 issues an operation instruction for a parallel processor to be executed by the transposition operation device 400 to the instruction decode unit 420.

The instruction decode unit 420 decodes an instruction code to obtain an address of a register from/to which data is read/written. When the address of the register to which data is written is an address of the transposition register, the instruction decode unit 420 outputs, to the transposition control unit 450, information necessary for transposition, such as the address of the transposition register and an address range of registers for storing a matrix of data.

When the address of the register from/to which data is read/written is an address of a register not belonging to the transposition register group 510 (a register other than the registers 0 to 7), a written matrix of data is read without performing transposition at the time of writing/reading data to/from the register.

The operation control unit 430 generates data path information used for performing operations from operation instructions executed sequentially. The data path information is generated based on a signal received from the instruction decode unit 420, and is information for selecting a function achieved by an operation instruction to be executed, an address of a register from/to which data is read/written, effective source and destination buses, and the like.

Based on the address of the register received from the instruction decode unit 420, the transposition control unit 450 determines information necessary for data arrangement for performing transposition, i.e. the circular shift amounts used by the output circular shift unit 270, the column position information used to read data from the transposition registers, and the circular shift amounts used by the input circular shift unit 260. For example, when reading processing from a register assigned with a register number 1 occurs, the instruction decode unit 420 uniquely determines read addresses for respective elements, which are the column position information, as {7, 0, 1, 2, 3, 4, 5, 6}, starting from a higher-order element, and uniquely determines the input circular shift amount and the output circular shift amount as −1 and +1, respectively. The information may be generated by storing the column position information and the circular shift amount corresponding to each register address in advance, or may be generated each time writing processing to the transposition register occurs.

When a result of the operation 1 is transposed to be used as an input of the operation 2, by designating the transposition register as an output register of the operation 1 and designating the transposition register as an input register of the operation 2, the transposition operation device 400 operates as follows. That is to say, the transposition operation device 400 circular-shifts the result of the operation 1 by using the output circular shift unit 270, and writes the circular-shifted data to the transposition register group 510 by using the register access unit 500. Then, when the operation 2 is performed, the transposition operation device 400 performs offset-reading from the transposition register group 510 according to the column position information by using the register access unit 500, circular-shifts a result of the offset-reading by using the input circular shift unit 260, and outputs the circular-shifted data to the operation unit 240. In the above-mentioned manner, data sequences as a result of transposition can be used as an input of the operation 2.

Parameters necessary for transposition, i.e. the output circular shift amounts, the column position information, and the input circular shift amounts, may not be uniquely determined by an address of a transposition register. When a bit width of each element and the number of data sequences to be transposed vary even if the address of the transposition register is the same, the parameters may not be the same.

FIGS. 11A, 11B, and 11C respectively show examples of setting address values as the column position information, the input circular shift amounts, and the output circular shift amounts when data composed of one-byte elements arranged in eight rows and columns is stored in registers assigned with register numbers 1 to 8.

<Operation>

Figure 12:
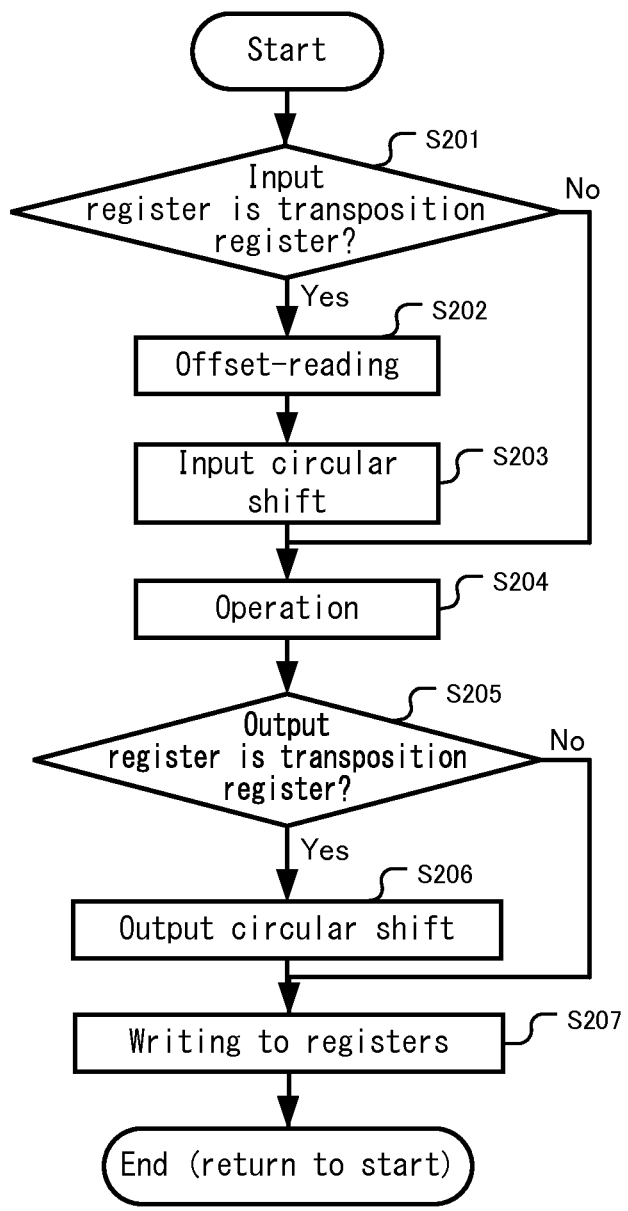
FIG. 12 is a flow chart showing processing performed by the transposition operation device in Embodiment 2.

FIG. 12 is a flow chart showing processing performed when the transposition operation device 400 according to the present embodiment executes one operation instruction.

The following describes transposition pertaining to the operation 1. Since steps S201 to S204 pertaining to the operation 1 depend on whether input data of the operation 1 is required to be transposed or not and are similar to steps S201 to S204 pertaining to the operation 2, description thereof is omitted.

When an output register designated by the operation instruction belongs to the transposition register group 510 (Yes in step S205), the transposition control unit 450 receives a register address from the instruction decode unit 420 and generates the output circular shift amounts, address values as the column position information, and the input circular shift amounts. The output circular shift unit 270 circular-shifts elements constituting each data sequence of the matrix output from the operation unit 240 according to the output circular shift amount received from the transposition control unit 450 (S206), and outputs a data sequence resulting from the circular-shift to the register access unit 500. The register access unit 500 writes the data sequence received from the output circular shift unit 270 to a register having an address designated by the operation control unit 430 as an address of a register to which data is written (S207).

The following describes transposition pertaining to the operation 2.

When a register having an address designated by the operation unit 240 as an address of a register from which data is read belongs to the transposition register group 510 (Yes in S201), the register access unit 500 receives address values as the column position information from the transposition control unit 450, reads data in each column of the matrix by offset-reading, and outputs the read data to the input circular shift unit 260 (S202). Step S202 differs from step S102 described above in that the above-mentioned address values as the column position information are used to identify each register for storing therein an element, in place of identifying each register for storing therein an element by using offset addresses.

The input circular shift unit 260 circular-shifts elements in each column of the matrix input from the register access unit 500, by using the input circular shift amount generated by the transposition control unit 450, and outputs the resulting data sequences to the operation unit 240 (S203).

On the other hand, when the output register designated by the operation instruction 1 does not belong to the transposition register group 510 (No in step S205), the output circular shift unit 270 outputs an output from the operation unit 240 to the register access unit 500 as it is. The output data is stored in the register group as illustrated in FIG. 6.

When the input register designated by the operation instruction 2 does not belong to the transposition register group 510 (No in S201), the register access unit 500 reads a data sequence from a register having an address designated by the operation control unit 430 without using the column position information. The input circular shift unit 260 outputs the data sequence read by the register access unit 500 to the operation unit 240 as it is.

In the present embodiment, by designating a transposition register as the output register by the operation instruction 1 and as the input register by the operation instruction 2, the result of the operation instruction 1 is transposed and used as input data of the operation instruction 2. On the other hand, by designating a register other than the transposition register as the output register by the operation instruction 1 and as the input register by the operation instruction 2, the result of the operation instruction 1 is used as input data of the operation instruction 2 as it is.

According to this structure, by using a part of the register as a dedicated register for transposition, whether or not to perform transposition can be set by designating addresses of input/output registers by the operation instruction, eliminating the need to set a register used for transposition in the transposition control unit. Furthermore, since data targeted for transposition and data not targeted for transposition are written to registers having different addresses, it is possible to prevent such an accident that order of data sequences is broken by mismanaging the data targeted for transposition and the data not targeted for transposition.

Embodiment 3

Figure 13:
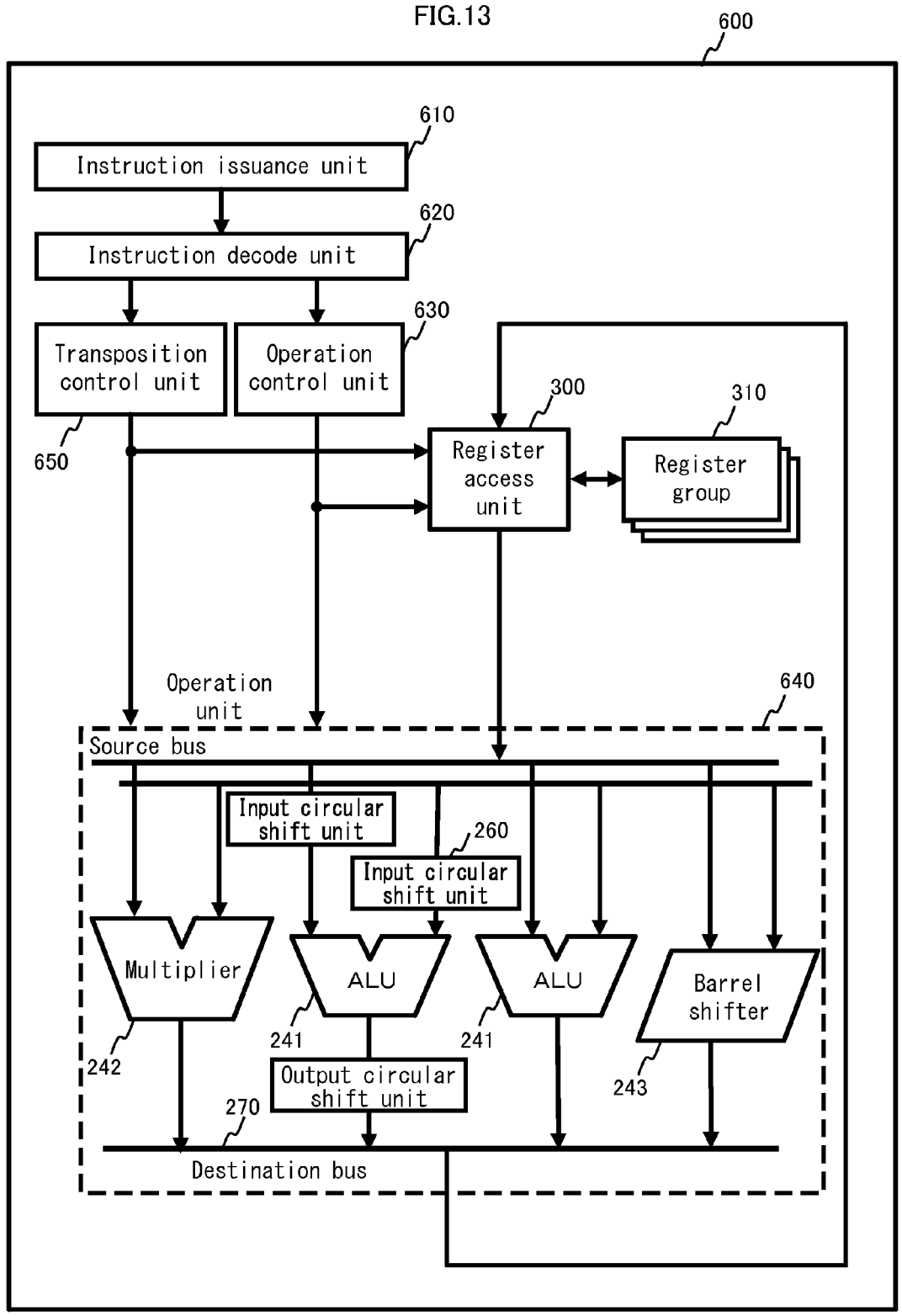
FIG. 13 is a block diagram illustrating an example of the structure of a transposition operation device in Embodiment 3.

FIG. 13 illustrates a transposition operation device 600 according to Embodiment 3. In FIG. 13, components that are the same as those in FIG. 1 are assigned with the same reference signs as those in FIG. 1, and description thereof is omitted.

The transposition operation device 600 includes an instruction issuance unit 610, an instruction decode unit 620, an operation control unit 630, the operation unit 640, a transposition control unit 650, a register access unit 300, and a register group 310.

The instruction issuance unit 610 issues an operation instruction including transposition and an operation instruction not including transposition. In addition to a normal operation instruction, the operation instruction including transposition includes parameters necessary for transposition, i.e. the column position information, the input circular shift amounts, the output circular shift amounts, or information necessary for determining these parameters. Suppose that a normal operation instruction is, for example, 'sub, R3, R16, R19', and 'mul, R5, R2, R24', an instruction obtained by adding parameters for transposition to the normal operation instruction, such as 'sub_offset0_rd0_wr3, R3, R16, R19' and 'mul_offset2_rd2_wr0, R2, R0, R24', is issued. In the above-exemplified instructions, offset2 indicates that, from among address correction values generated in advance as the column position information, an address correction value of pattern 2 is to be used, rd2 indicates that the input circular shift amount is two, and wr3 indicates that the output circular shift amount is three. As described later, transposition is made possible by setting a value of wr with respect to an instruction to output a result of the operation in a transposition prepared state to registers, and properly setting values of offset and rd with respect to an instruction to read data stored in a transposition prepared state from the registers to transpose the data before performing the operation.

The instruction decode unit 620 determines whether or not the operation instruction includes transposition when decoding an instruction code. When the operation instruction includes transposition, the instruction decode unit 620 outputs, to the transposition control unit 650, information for transposition having added to the instruction.

The transposition control unit 650 generates the column position information, the input circular shift amounts, and the output circular shift amounts based on the information for transposition output from the instruction decode unit 620. The column position information, the input circular shift amounts, and the output circular shift amounts may be determined by using a pattern of the column position information, the input circular shift amounts, and the output circular shift amounts that are directly added to the instruction as in the above example, or by generating in advance a plurality of combinations of the column position information, the input circular shift amounts, and the output circular shift amounts and designating a combination to be used by using the instruction code. Alternatively, whether to use one of the generated combinations of the column position information, the input circular shift amounts, and the output circular shift amounts or to newly generate the combination may be specified by the instruction code, and, each time the instruction code specifies that the combination is newly generated, the combination of the column position information, the input circular shift amounts, and the output circular shift amounts may be generated.

When a matrix of data is written to the register group 310, the transposition control unit 650 outputs the output circular shift amounts to the operation unit 640, and, when the matrix is read from the register group 310, the transposition control unit 650 outputs the column position information to the register access unit 300 and outputs the input circular shift amounts to the operation unit 640.

With respect to an operation instruction including transposition before performing an operation, the operation control unit 630 generates data path information so that an operator including the input circular shift unit 260 is used. With respect to an operation instruction including transposition of a result of the operation instruction, the operation control unit 630 generates data path information so that an operator including the output circular shift unit 270 is used.

The operation unit 640 includes an operator that rearranges input data pieces and an operator that handles the input data pieces as they are, and performs an operation including transposition and an operation not including transposition by receiving various parameters used in transposition and operations from the transposition control unit 650 and the operation control unit 630.

<Operation>

Figure 14:
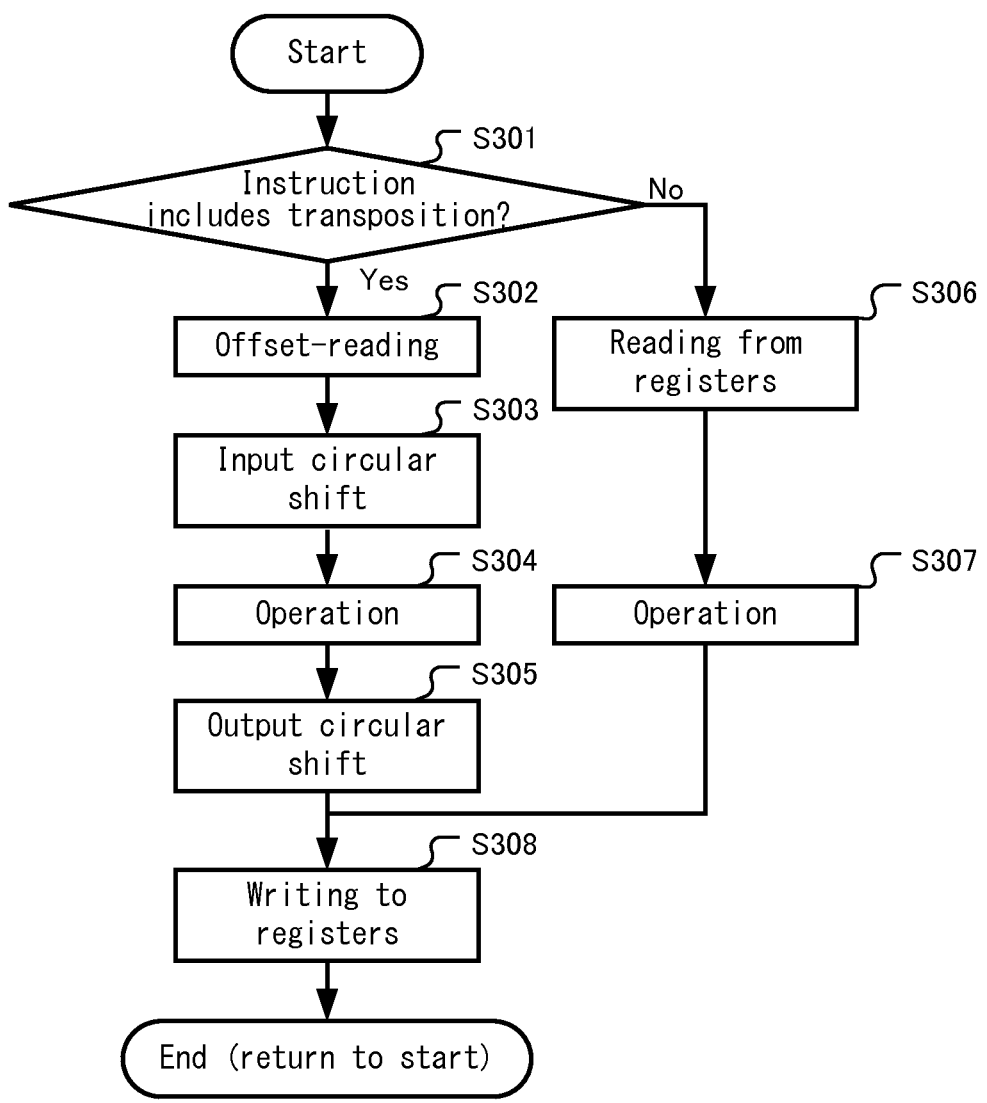
FIG. 14 is a flow chart showing processing performed by the transposition operation device in Embodiment 3.

FIG. 14 is a flow chart showing processing performed when the transposition operation device 600 according to the present embodiment executes one operation instruction.

The following describes a case where a result of the operation instruction 1 is transposed to be used as an input of the operation instruction 2.

Transposition pertaining to the operation instruction 1 is described below.

The transposition operation device 600 performs an operation by using, from among operators included in the operation unit 640, an operator including the input circular shift unit 260 and the output circular shift unit 270. After the operation is performed (S304), the output circular shift unit 270 rearranges elements constituting a data sequence by using the output circular shift amount generated from the operation instruction (S305).

The register access unit 300 writes an output of the operation unit 640 to a register having an address designated by the operation control unit 630 (S308).

Transposition pertaining to the operation instruction 2 is described next.

When the operation instruction includes transposition (Yes in S301), the register access unit 300 receives a read address designated by the operation control unit 630, receives a read address correction value from the transposition control unit 650, and reads a data sequence by offset-reading (S302). Details thereof are omitted as they are similar to those in S104. The transposition operation device 600 then executes the operation instruction by using, from among operators included in the operation unit 640, an operator including the input circular shift unit 260 and the output circular shift unit 270. The input circular shift unit 260 first rearranges elements constituting the data sequence by using the input circular shift amount received from the transposition control unit 650 to generate a transposed matrix (S303). With this structure, the operator can executes the operation instruction 2 by using, as an input, data obtained by transposing a result of the operation instruction 1.

When the operation instruction does not include transposition (No in S301), the following processing is performed.

In the operation instruction 1, an operation is performed by using, from among operators included in the operation unit 640, an operator not including the input circular shift unit 260 and the output circular shift unit 270 (S307). The register access unit 300 then writes an output of the operation unit 640 to a register having an address designated by the operation control unit 630 (S308).

In the operation instruction 2, the register access unit 300 reads a data sequence by using the read address designated by the operation control unit 630 (S306). The transposition operation device 600 then performs an operation by using, from among operators included in the operation unit 640, an operator not including the input circular shift unit 260 and the output circular shift unit 270 (S307).

According to this structure, by adding an instruction for output circular shift to the operation instruction 1 and adding an instruction for offset-reading and input circular shift to the operation instruction 2, data obtained by transposing a result of the operation instruction 1 can be received as input data by an operator for executing the operation instruction 2. In this case, information on transposition should be added to the operation instruction so that the output circular shift amounts in the operation instruction 1 for respective rows of the matrix are $\{+1, +2, \ldots, +7, 0\}$, the address correction values in the operation instruction 2 for the first row are $\{+7, 0, +1, +2, \ldots, +6\}$, and the input circular shift amounts in the operation instruction 2 for the respective rows of the matrix are $\{-1, -2, \ldots, -7, 0\}$, for example. If the instruction for output circular shift is not added to the operation instruction 1 and the instruction for offset-reading and input circular shift is not added to the operation instruction 2, the result of the operation instruction 1 can be received as input data of the operation instruction 2 as it is.

According to this structure, the column position information, the output circular shift amounts, and the input circular shift amounts for transposition can arbitrarily be set by a creator of the operation instruction, and thus addresses of registers for storing therein a matrix of data to be transposed are not restricted.

Embodiment 4

Embodiment 1 describes a case where, when a result of an operation after performing transposition is used (in a transposed state) as an input of a next operation, the result is output to the next operation without performing processing pertaining to transposition, and, when the result is restored to an original state, the result is re-transposed before performing the next operation. The present embodiment describes a case where the result of the operation after performing transposition is restored to the original state by a method different from the re-transposition.

A transposition operation device according to the present embodiment has a similar structure to that in Embodiment 1 except that, in place of the register access unit 300, a register access unit 700 is included. In addition to the functions of the register access unit 300, the register access unit 700 has the following functions.

When the register access unit 700 receives a write instruction from the operation control unit 230 along with designation of an address, and the transposition control unit 250 designates the address correction values, the register access unit 700 divides a data sequence received from the output circular shift unit 270 into elements and writes the elements to registers while selecting a different one of the registers for each element. Such writing using the address correction values is referred to as offset-writing.

Figure 15:
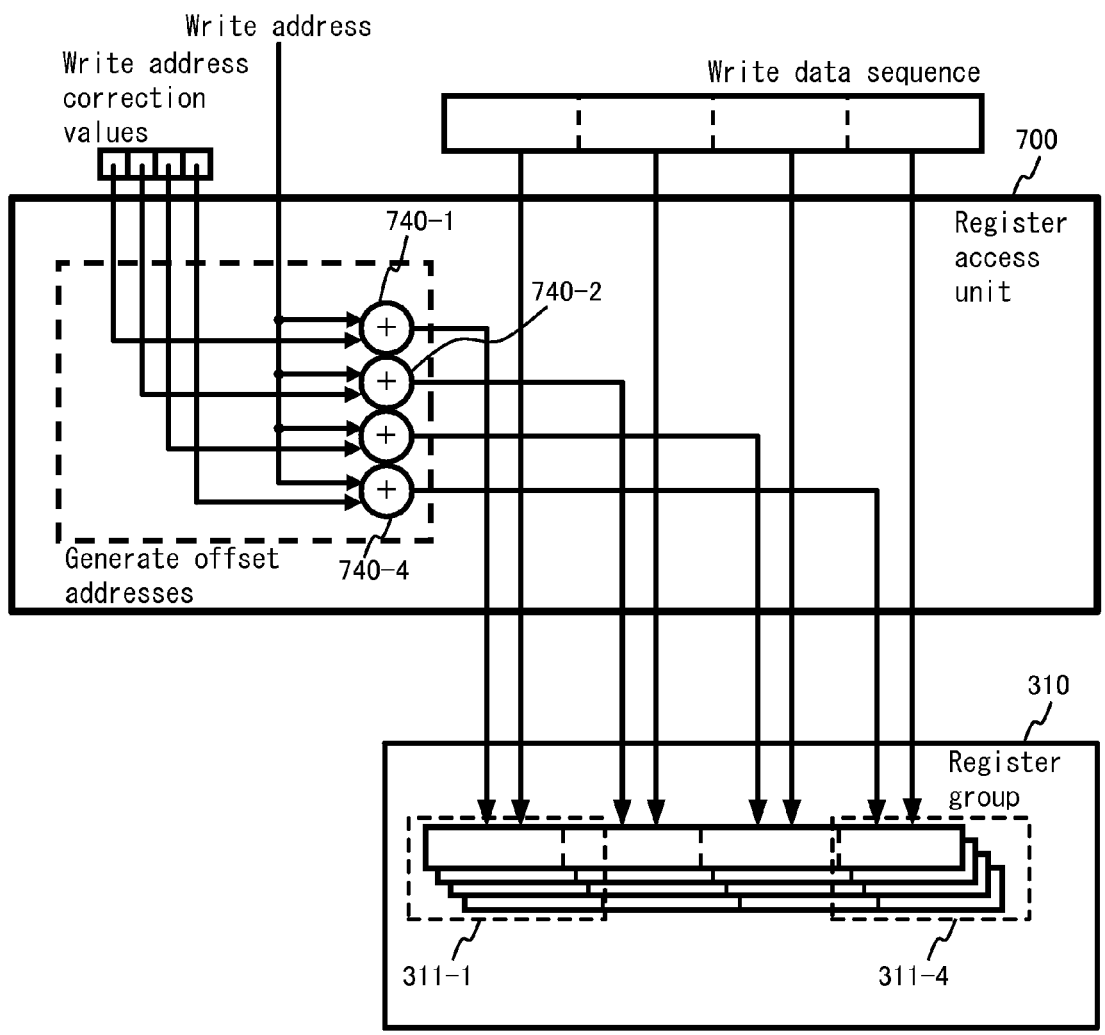
FIG. 15 is a block diagram illustrating an example of the structure of a register access unit in Embodiment 4.

A method, performed by the register access unit 700, for writing the elements to the registers while selecting a different one of the registers for each element is described with use of FIG. 15. The register access unit 700 divides a data sequence to be written into elements. The register access unit 700 then selects registers as a target for writing from among registers constituting the register group 310, and writes the elements through input units included in the selected registers.

The register access unit 700 first adds the address correction values to the address designated by the operation control unit 230 (write address) by using adders 740-1 to 740-4 to generate an offset address for each element. Upon output, from the adder 740-1, of an offset address obtained by adding an address correction value corresponding to the first element to the write address, the register access unit 700 selects an area for storing therein the first element of a register having the output offset address from among an area 311-1 for storing therein the first element of each register belonging to the register group 310, and writes the first element of the data sequence to the selected area. The register access unit 700 also selects, by using an offset address output from the adder 740-2, an area for storing therein the second element of the data sequence from among an area 311-2 for storing therein the second element of each register belonging to the register group 310, and writes the second element of the data sequence to the selected area. Similarly, the third and fourth elements of the data sequence are written to the register group 310 by using an offset address generated by the adder 740-3 and an offset address generated by the adder 740-4, respectively. In the above-mentioned manner, the register access unit 700 writes all the elements constituting the data sequence to be written to the register group 310.

<Operation>

Since processing performed before an operation in the operation 2 is the same as that in Embodiment 1, description thereof is omitted. Subsequent processing to store a result of the operation performed by the operation unit 240 in the register group 310 is described with use of the drawings.

When data arrangement is restored to an original state after completion of image processing, transposition is performed as described below.

A result of the operation output from the operator is transformed by the output circular shift unit 270 such that elements constituting each data sequence are rearranged. In a case where elements are stored at element positions 0 to 7 of a transposed matrix, the amount of circular shift is determined by a difference from an element stored at the element position 0. FIG. 16A illustrates a set of data sequences to be written, which is a result of the operation having been circular-shifted.

The transposition control unit 250 generates the address correction values used to perform writing to the register group 310. The register access unit 700 writes elements in the matrix as the result of the operation to the register group 310 while selecting a different one of register addresses for each element by using the write address designated by the operation control unit 230 and the address correction values generated by the transposition control unit 250.

FIGS. 16B and 17C illustrate writing to the register group, for example, in a case where operation performed on elements at the element position 5 and operation performed on elements at the element position 3 are completed in this order. As illustrated in FIG. 17C, when the elements P03 to P73 at the element position 3 are written to registers, the address correction values for the fourth, fifth, and sixth elements are designated as 0, +1, and +2, respectively. Similarly, as illustrated in FIG. 16B, the elements P05 to P75 at the element position 5 are written to registers, the address correction values for the sixth, seventh, and eighth element are designated as 0, +1, and +2, respectively. In order to write elements constituting a different data sequence, similarly to the offset-reading described in Embodiments 1 to 3, a position of the reference element is changed, and the address correction value for a write access is generated so as to increase by one from the address correction value for the reference element. When the reference element (element for which the address correction value is set to 0) is not the first element, a value obtained by adding one to the address correction value for the last element is set as the address correction value for the first element. As illustrated in FIG. 17D, when writing of all the elements is completed, a matrix of data is stored in the register group 310 in a transposition prepared state.

By performing circular shift after completion of writing of all the elements, the matrix is restored to an image format illustrated in FIG. 6.

When an operation is performed by using a matrix stored in the register group 310 as input data, the following processing may be performed. Circular shift is not performed after writing to the register group 310 but performed by the input circular shift unit 260 when data is read from the register group 310 to perform the operation. With this structure, the operation unit 240 can receive data sequences with original arrangement. This eliminates the need to perform circular shift before data is read from the register group 310.

According to this structure, for example, when an operation is performed by using a transposed matrix and, after a part of the transposed matrix is updated, the transposed matrix is restored to a matrix with arrangement before transposition, only elements in each column of the matrix to be updated by the operation (elements in each row of the transposed matrix) have to be stored in the register group 310, and there is no need to write the entire matrix as a result of the operation to the register group 310 for transposition. As a result, a time to perform image processing including transposition is reduced.

Embodiment 5

Described in Embodiments 1 to 4 is a case where the output circular shift amounts for respective rows of a matrix are {0, +1, +2, +3, +4, +5, +6, +7}, the address correction values are as illustrated in FIGS. 7B, 8C, and 8D, and the input circular shift amounts for respective rows of the matrix are {0, −1, −2, −3, −4, −5, −6, −7}. Described in the present embodiment is a case where elements are rearranged before being written to the register group 310 and after being read from the register group 310 by a method other than circular shift.

Figure 18:
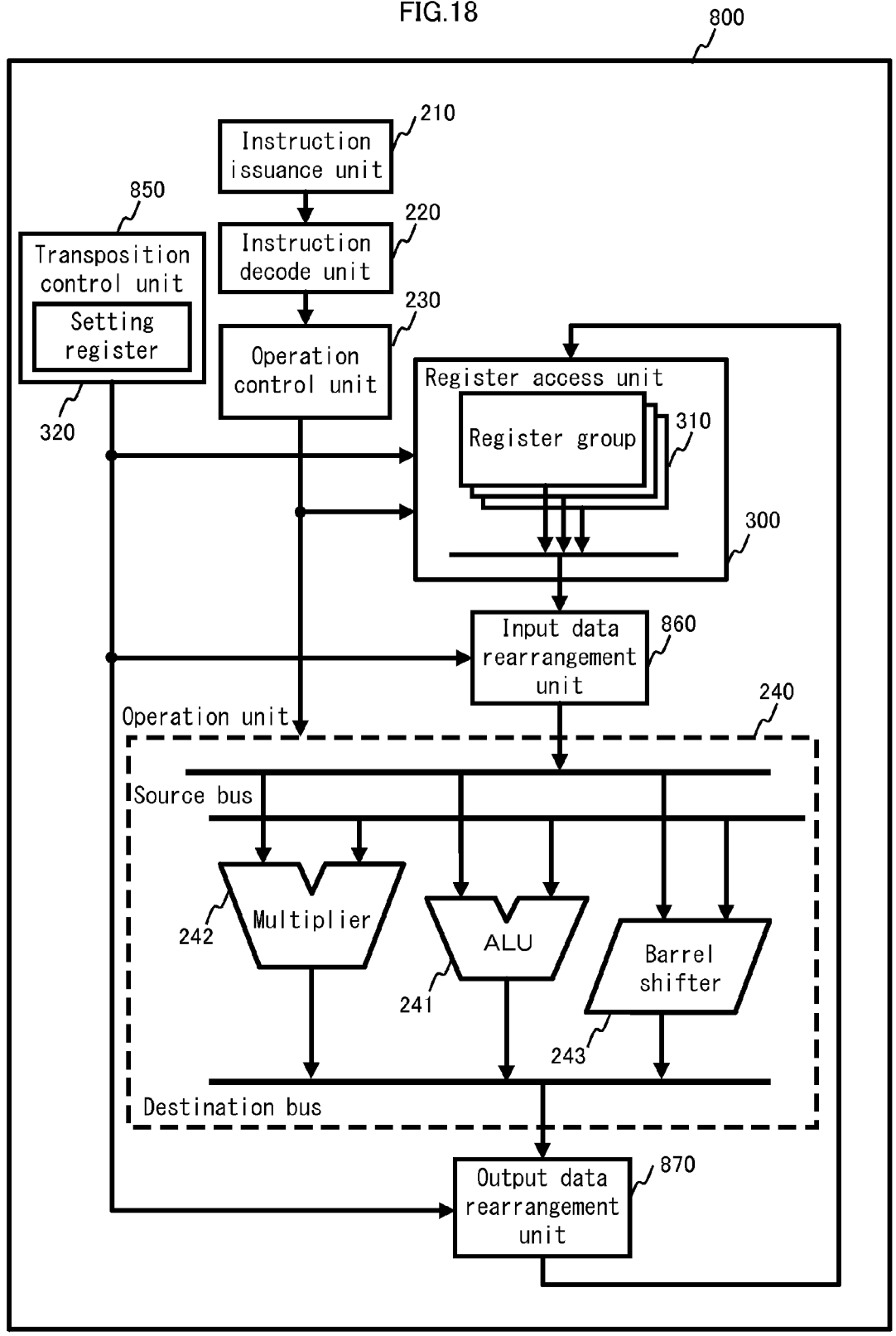
FIG. 18 is a block diagram illustrating an example of the structure of a transposition operation device in Embodiment 5.

FIG. 18 illustrates a transposition operation device 800 according to Embodiment 5. In FIG. 18, components that are the same as those in FIG. 1 are assigned with the same reference signs as those in FIG. 1, and description thereof is omitted.

The transposition operation device 800 includes the instruction issuance unit 210, the instruction decode unit 220, the operation control unit 230, the operation unit 240, a transposition control unit 850, the register access unit 300, the register group 310, an input data rearrangement unit 860, and an output data rearrangement unit 870.

The input data rearrangement unit 860 rearranges elements constituting a data sequence read by the register access unit 300 from the register group 310.

How to rearrange the elements constituting the data sequence is determined by input rearrangement information designated by the transposition control unit 850.

A data sequence resulting from the rearrangement by the input data rearrangement unit 860 is passed to the operation unit 240 as input data.

The output data rearrangement unit 870 rearranges elements constituting a data sequence resulting from the operation performed by the operation unit 240. Similar to the input data rearrangement unit 860, how to rearrange the elements constituting the data sequence is determined by the transposition control unit 850. A data sequence resulting from the rearrangement is output to the register access unit 300.

By performing data rearrangement and offset-reading in the processing to read data from the register group 310 pertaining to an operation performed after transposition and in the processing to write data to the register group 310 pertaining to an operation to output the data, the transposition control unit 850 can perform transposition without causing the operation unit 240 to perform transposition. The transposition control unit 850 generates output arrangement information, the address correction values as the column position information used in offset-reading, and the input rearrangement information required for transposition as described above, and stores the generated information pieces in the setting register 320 included therein. The input data rearrangement unit 860, the output data rearrangement unit 870, and the register access unit 300 respectively acquire the input rearrangement information, the output rearrangement information, and the address correction values from the setting register 320.

<Operation>

The following describes transposition procedures for a matrix of eight rows and columns performed by the transposition operation device 800.

In order to store image data in the register group 310, the transposition control unit 850 provides setting of the output rearrangement information for the setting register 320, and the output data rearrangement unit 870 performs rearrangement based on the output rearrangement information. The transposition control unit 850 sets the output rearrangement information so that elements in the same column (e.g. the elements P00 to P70) of a matrix before transposition are in different columns of a transformed matrix. For example, the transposition control unit 850 sets the output rearrangement information for the elements P00 to P07 so that the elements P00 to P07 are not rearranged, the output rearrangement information for the elements P10 to P17 as {6, 0, 1, 4, 3, 2, 7, 5}, the output rearrangement information for the elements P20 to P27 as {5, 7, 0, 1, 2, 3, 4, 6}. The rearrangement information indicates an order in which elements constituting a data sequence are rearranged. For example, a data sequence obtained by rearranging elements constituting a data sequence {P00, P01, P02, P03} according to the rearrangement information {3, 1, 2, 0} is a data sequence {P03, P01, P02, P00}.

Figure 19:
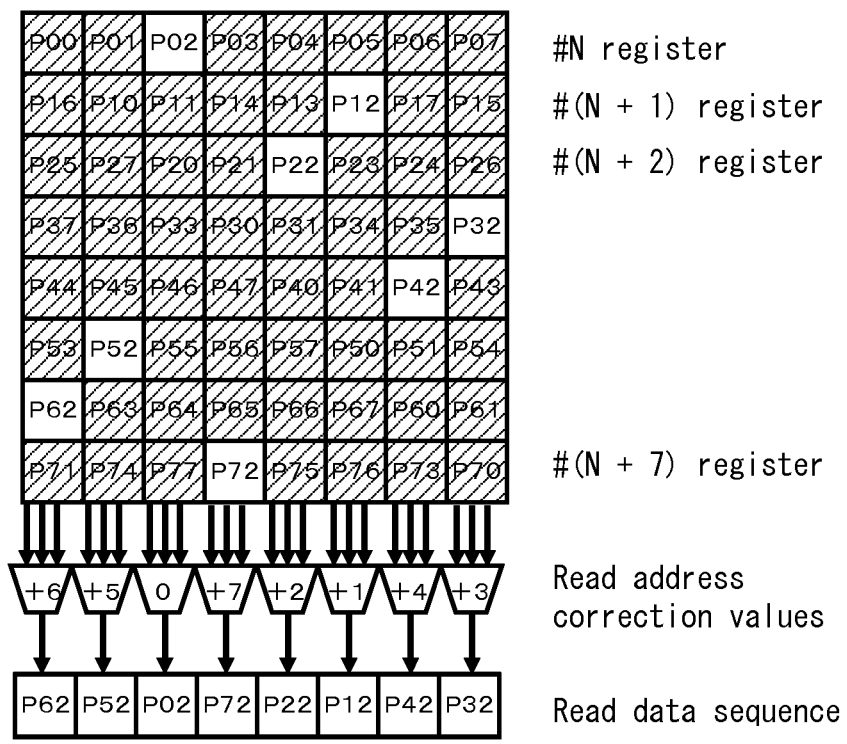
FIGS. 19A and 19B show rearrangement procedures for read data in Embodiment 5.

The output data rearrangement unit 870 then outputs data sequences resulting from the rearrangement to the register access unit 300. The register access unit 300 stores the elements P00 to P07, the elements P10 to P17, and the elements P20 to P27 respectively in the registers having register addresses N, N+1, and N+2, as designated by the operation control unit 230. FIG. 19A illustrates a state where all the data sequences are stored.

The following describes transposition in the operation 2.

The transposition control unit 850 generates the address correction values for each element in the same column of the matrix before transposition. The register access unit 300 performs offset-reading by using the register address N designated by the operation control unit 230 and the address correction values generated by the transposition control unit 850, and outputs a data sequence in each column of the matrix before transposition.

The following describes a method for generating the address correction values. For example, as shown in FIG. 19B, when a data sequence composed of the elements P02 to P72 in the third column of the matrix before transposition is read, the address correction values for the elements P02 to P72 are set to {+6, +5, 0, +7, +2, +1, +4, +3}.

Similarly, when a data sequence composed of the elements P07 to P77 is read, the address correction values for the elements P07 to P77 may be set to {+3, +2, +7, +4, +5, +6, +1, 0}. By repeating the offset-reading while changing a position of the reference element, the matrix of data stored in the registers is read such that data sequences in respective columns of the matrix before transposition are read one at a time. FIG. 20C illustrates a state where all the data sequences are read.

Finally, the transposition control unit 850 notifies the input data rearrangement unit 860 of the input rearrangement information to perform rearrangement so that the read data sequences correspond to data sequences in respective rows of the transposed matrix. For example, in order to rearrange elements in the fourth column (the elements P03 to 073) so that {P53, P63, P33, P03, P13, P23, P73, P43} is rearranged to be {P03, P13, P23, P33, P43, P53, P63, P73}, the input rearrangement information is set to {3, 4, 5, 2, 7, 0, 1, 6}.

Rearrangement is performed on all the read data sequences by using the input rearrangement information, so that input data for the operation unit 240 becomes equivalent to a transpose of the matrix of eight rows and columns, as illustrated in FIG. 20D.

According to this structure, a method for rearranging elements in each row of the matrix before being written to the register group 310 for offset-reading is not limited to right circular shift whose amount increases by one with an increasing row number of the matrix. A matrix of data can be transposed based on the present invention by performing rearrangement so that elements in the same column of the matrix are in different column of a matrix after rearrangement.

<Other Modifications According to Embodiments>

(1) Described in Embodiments 1 to 5 is a case where the entire matrix as a target for transposition is output to the operation unit 240 or 640 for performing the operation 2 by using the column position information (address correction values) corresponding to all the columns of the matrix. The present invention, however, is not limited to this case. For example, when only data sequences in the first, second, and third columns of the matrix as a target for transposition are used in the operation 2, only the part of the matrix may be output to the operation unit 240 or 640. With this structure, for example, it becomes possible to perform operations that require a part of a transposed matrix in parallel without generating the entire transposed matrix.

(2) In Embodiments 1 to 4, a minimum unit of the circular shift amount is equal to the width of each element. The input circular shift unit 260 and the output circular shift unit 270 perform circular shift by an amount (the number of bits) indicated by a value obtained by multiplying the designated circular shift amount by the width of each element. The present invention, however, is not limited to this structure. For example, the minimum unit of the circular shift amount may be one bit, and the circular shift amount may be designated by the number of bits. Alternatively, the minimum unit of the circular shift amount may be an integral multiple of (e.g. twice, four times) the width of each element. With this structure, for example, when the width of each element is eight bits, it is possible to transpose a matrix composed of 16-bits elements.

(3) Described in Embodiment 1 is a case where the output circular shift amounts for respective rows of the matrix are {0, +1, +2, +3, +4, +5, +6, +7}, the address correction values are as illustrated in FIGS. 7B, 8C, and 8D, and the input circular shift amounts for respective rows of the matrix are {0, −1, −2, −3, −4, −5, −6, −7}. Described in Embodiment 2 is a case where the address correction values for register access, the input circular shift amounts, and the output circular shift amounts are as illustrated in FIGS. 11A, 11B, and 11C, respectively. The present invention, however, is not limited to this case. For example, the output circular shift amounts and the input circular shift amounts for respective rows of the matrix may respectively be {+6, +7, 0, +1, +2, +3, +4, +5} and {−6, −7, 0, −1, −2, −3, −4, −5}, and the address correction values for elements in the first column may be set to {+2, +3, +4, +5, +6, +7, 0, +1} so as to correspond to the circular shift amounts. As described above, by setting the output circular shift amount to a value that increases by one with an increasing row number and setting the input circular shift amount to have the same absolute value as the output circular shift amount and have an opposite sign to the output circular shift amount, the present invention can be implemented according to Embodiments 1 to 4.

(4) Described in Embodiments 1, 2, and 3 is a case where the input circular shift amount has the same absolute value as the output circular shift amount and has an opposite sign to the output circular shift amount. The present invention, however, is not limited to this case. For example, when a matrix as a target for transposition is a matrix of n (n is an integer equal to or greater than two) rows and columns, the sum of the output circular shift amounts and the input circular shift amounts for the jth (j is an integer equal to or greater than one and equal to or smaller than n) row of the matrix may be an integral multiple of n (the minimum unit of the circular shift amount is the width of each element).

(5) Described in Embodiments 2 and 3 is a case where, after an operation including transposition is performed, in order to restore a result of the operation to an original state, transposition is performed between the operation and an operation that uses the result of the operation as input data. The present invention, however, is not limited to this case. For example, as in Embodiment 4, when the result of the operation is stored in registers, the register access unit 300 or 500 may have the functions of the register access unit 700 so as to write data to the registers by using corrected write addresses, and, when the operation that uses the data is performed, the register access unit 300 or 500 may read the data as normal and the input circular shift unit 260 may perform the circular shift.

Alternatively, when transposition is performed in Embodiments 1 to 3, the circular shift by the output circular shift unit 270 and the offset-writing by the register access unit 300 or 500 may be performed in the operation instruction 1, and, in the operation instruction 2, the register access unit 300 or 500 may read data as normal and the input circular shift unit 260 may perform the circular shift.

(6) Described in Embodiment 2 is a case where the registers assigned with numbers 0 to 7 are the transposition registers. The present invention, however, is not limited to this case. For example, registers assigned with numbers 24 to 31 may be the transposition registers, and registers assigned with numbers 0 to 15 may be the transposition registers so that data of up to 16 rows and columns can be transposed.

(7) Described in Embodiment 3 is a case where an operation instruction not including transposition is executed by using an operator not including the input circular shift unit 260 and the output circular shift unit 270. The present invention, however, is not limited to this case. For example, the operation instruction not including transposition may be executed by an operator including the input circular shift unit 260 and the output circular shift unit 270 as an operation instruction including transposition in which the input circular shift amount is set to 0 and the output circular shift amount is set to 0. In contract, the operation instruction including transposition in which the input circular shift amount is set to 0 and the output circular shift amount is set to 0 may be executed by using an operator not including the input circular shift unit 260 and the output circular shift unit 270. Alternatively, the operation unit 640 may include an operator only including the input circular shift unit 260 so that the operator can execute an operation instruction including transposition in which the input circular shift amount is set to a value other than 0 and the output circular shift amount is set to 0. The operation unit 640 may include an operator only including the output circular shift unit 270 so that the operator can execute an operation instruction including transposition in which the input circular shift amount is set to 0 and the output circular shift amount is set to a value other than 0. With this structure, it is possible to improve efficiency of parallel processing and to reduce hardware resources by sharing resources for operators.

In Embodiments 1 and 2, as in the operation unit 640, the operation unit 240 may be configured such that the input circular shift unit 260 and the output circular shift unit 270 are provided for each operator. For example, in Embodiment 2, the operator including the input circular shift unit 260 may execute an instruction including reading from a transposition register, and the operator including the output circular shift unit 270 may execute an instruction including writing to a transposition register.

(8) Described in Embodiments 1, 3 to 5 is a case where the transposition control unit 250 provides the column position information as the address correction values, which are differences from an address of a register from which data is read and are generated by the operation control unit 230, 430, or 630. The present invention, however, is not limited to this case. For example, as in Embodiment 2, register addresses may be directly designated as the column position information. With this structure, transposition according to the present invention can be performed even when addresses of registers for storing therein a matrix to be transposed have non-sequential values, and there is no need to generate register addresses used by the operation control unit 230, 430, 630, or 830 to perform offset-reading.

(9) Described in Embodiments 1, 3 to 5 is a case where a matrix of eight rows and columns is transposed. The present invention, however, is not limited to this case. For example, when the register group is composed of M registers each can store therein M elements, a matrix of m rows and columns (m≤M) can be transposed. In Embodiment 2, when the transposition register group 510 is composed of M registers each can store therein M elements, a matrix of m rows and columns (m≤M) can be transposed.

When a matrix as a target for transposition is not a square matrix, by adding one or more rows and columns to the matrix so that the matrix is transformed to be the square matrix, outputting the square matrix to the output circular shift unit 270, and removing the added one or more rows and columns from an output of the input circular shift unit 260, transposition can be performed by a method according to the present invention.

(10) Described in Embodiments 1 to 5 is a case where a result of the operation 1 is transposed to be used as an input of the operation 2. The present invention, however, is not limited to this case. For example, when a matrix of data stored in the image memory 130, which is an external storage unit, is transposed to be used as an input of the operation 2, the operation 1 may be performed such that data is input from the image memory 130 to the register group 310 or the transposition register group 510 without performing an operation. Similarly, for example, when the result of the operation 1 is transposed and then stored in the image memory 130, the operation 2 may be performed such that data is input from the register group 310 or the transposition register group 510 to the image memory 130 without performing an operation.

(11) The transposition operation device in each of the above-mentioned embodiments may typically be embodied as LSI (Large Scale Integration) as an integrated circuit. Each of circuits may be configured as a single chip, or a part or all thereof may be configured as a single chip.

While referred to here as LSI, depending on the degree of integration, the terms IC (Integrated Circuit), system LSI, super LSI, or ultra LSI are also used.

A method of integration is not limited to LSI, and a dedicated circuit or a general-purpose processor may be used. A FPGA (Field Programmable Gate Array), which is LSI that can be programmed after manufacture, or a reconfigurable processor, which is LSI whose connections between internal circuit cells and settings for each circuit cell can be reconfigured, may be used.

Additionally, if technology for integrated circuits that replaces LSI emerges, owing to advances in semiconductor technology or to another derivative technology, the integration of functional blocks may naturally be accomplished using such technology.

(12) Embodiments 1 to 5 are only described by way of examples of the present invention, and various changes and modifications can be made unless otherwise such changes and modifications depart from the scope of the present invention.

<Supplemental Note>

The following describes the structures and effects of the transposition operation device according to each embodiment, an integrated circuit for the same, and a transposition method.

(1) A transposition operation device according to Embodiments is a transposition operation device including: a register group configured to store therein a matrix of data as a target for operation and composed of a plurality of registers, each register being configured to store therein elements in a respective row of the matrix such that the elements are readable one at a time; a transposition control unit configured to generate output rearrangement information, column position information, and input rearrangement information for the matrix, the output rearrangement information being used to rearrange elements in each row of the matrix to generate a transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements; an output data rearrangement unit configured to generate the transformed matrix by using the output rearrangement information; a register access unit configured to (i) write the transformed matrix to the register group, and (ii) output the elements in the same column of the matrix by reading the transformed matrix from the register group and selecting, for each column of the transformed matrix, a different one of the registers by using the column position information; an input data rearrangement unit configured to rearrange the output elements by using the input rearrangement information; and an operation unit configured to perform an operation on the rearranged elements.

An integrated circuit according to Embodiments is an integrated circuit including: a register group configured to store therein a matrix of data as a target for operation and composed of a plurality of registers, each register being configured to store therein elements in a respective row of the matrix such that the elements are readable one at a time; a transposition control unit configured to generate output rearrangement information, column position information, and input rearrangement information for the matrix, the output rearrangement information being used to rearrange elements in each row of the matrix to generate a transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements; an output data rearrangement unit configured to generate the transformed matrix by using the output rearrangement information; a register access unit configured to (i) write the transformed matrix to the register group, and (ii) output the elements in the same column of the matrix by reading the transformed matrix from the register group and selecting, for each column of the transformed matrix, a different one of the registers by using the column position information; an input data rearrangement unit configured to rearrange the output elements by using the input rearrangement information; and an operation unit configured to perform an operation on the rearranged elements.

A transposition method according to Embodiments is a transposition method for use in a transposition operation device including a register group configured to store therein a matrix of data as a target for operation and composed of a plurality of registers, each register being configured to store therein elements in a respective row of the matrix such that the elements are readable one at a time, the transposition method including: an output data rearrangement step of rearranging elements in each row of the matrix to generate a transformed matrix so that elements in a same column of the matrix are in different columns of the transformed matrix; a data storage step of storing the transformed matrix in the register group; a column position information generation step of generating column position information indicating positions in the register group at which the elements in the same column of the matrix are stored; a data reading step of reading the elements in the same column of the matrix from the register group by selecting, for each column of the transformed matrix, a different one of the registers by using the column position information; an input data rearrangement step of rearranging the read elements; and an operation step of performing an operation on the rearranged elements.

According to the above-mentioned structure, the transposition operation device can write a matrix of data required to be transposed to the register group after rearranging elements in each row of the matrix, and generate a transposed matrix by reading and rearrangement. It is therefore unnecessary to transfer the matrix to a storage device other than the register for transposition. Furthermore, elements in each row of the matrix are written to the register group at one time, elements in each column of the matrix read from the register group at one time are rearranged, and an operation is performed on the rearranged elements. As a result, a time required to perform transposition can be reduced.

(2) In the above-mentioned transposition operation device according to Embodiments as described in the section (1), the output rearrangement information may include an output circular shift amount indicating an amount of circular shift performed for each row of the matrix.

With this structure, rearrangement performed to write data to the register group is simplified.

(3) In the above-mentioned transposition operation device according to Embodiments as described in the section (2), the input rearrangement information may include an input circular shift amount indicating an amount of circular shift performed for the output elements, the output circular shift amount may indicate an amount of right circular shift and increase by one with an increasing row number, and the input circular shift amount may have a same absolute value as the output circular shift amount and have an opposite sign to the output circular shift amount.

With this structure, rearrangement performed to write/read data to/from the register group is simplified.

(4) In the above-mentioned transposition operation device according to Embodiments as described in the section (1), the transposition control unit may include a setting register configured to store therein setting information indicating that the matrix is to be transposed, and, when the setting information is stored in the setting register, generate the output rearrangement information, the column position information, and the input rearrangement information.

With this structure, rearrangement required to write/read information for transposition to/from registers can be performed in association with an operation to output data required to be transposed and an operation to input transposed data.

(5) In the above-mentioned transposition operation device according to Embodiments as described in the section (1), the register group may include a dedicated register configured to store therein a matrix of data to be transposed, and the transposition control unit may generate the output rearrangement information, the column position information, and the input rearrangement information when the register access unit writes and reads a matrix of data to and from the dedicated register.

With this structure, the transposition operation device can determine whether a matrix of data is to be transposed or not by determining whether a register from/to which the matrix is read/written is the dedicated register or not.

(6) In the above-mentioned transposition operation device according to Embodiments as described in the section (1), an operation instruction executed by the transposition operation device may include information on whether each of a matrix as a target for the operation instruction and a matrix resulting from the execution of the operation instruction is to be transposed, and the transposition control unit may generate the output rearrangement information, the column position information, and the input rearrangement information by using the information included in the operation instruction.

With this structure, transposition can be performed by adding setting information relating to transposition to an operation instruction to output data required to be transposed and an operation instruction requiring the transposed data. An instruction indicating an operation instruction including transposition is therefore unnecessary.

(7) The transposition operation device according to Embodiments may be a transposition operation device including: a register group configured to store therein a matrix of data as a target for operation and composed of a plurality of registers, each register being configured to store therein elements in a respective row of the matrix such that the elements are readable one at a time; a transposition control unit configured to generate output rearrangement information, column position information, and input rearrangement information for the matrix, the output rearrangement information being used to rearrange elements in each row of the matrix to generate a transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements; an output data rearrangement unit configured to generate the transformed matrix by using the output rearrangement information; a register access unit configured to, by using the column position information, write elements in the ith row (i≥1) of the transformed matrix to positions in the register group at which elements in the ith column of the transformed matrix are to be stored, and read data from the register group; an input data rearrangement unit configured to rearrange elements constituting the read data by using the input rearrangement information; and an operation unit configured to perform an operation on the rearranged elements.

With this structure, when a matrix of data required to be transposed is written to the register group, elements in each row of the matrix are rearranged and recorded in the register group as elements in each column of the matrix. The transposed matrix can therefore be obtained only by reading the matrix from the register group and rearranging the elements of the matrix.

INDUSTRIAL APPLICABILITY

The transposition operation device according to the present invention is useful in image processing including transposition performed, for example, by a digital TV, a recorder, a digital still camera, a digital video camera.

REFERENCE SIGNS LIST 100 image processing apparatus
110 image input unit
120 input processing unit
130 image memory
140 system control unit
150 signal processing unit
200, 400, 600, 800 transposition operation device
210, 410, 610 instruction issuance unit
220, 420, 620 instruction decode unit
230, 430, 630 operation control unit
240, 640 operation unit
250, 450, 650 transposition control unit
260 input circular shift unit
270 output circular shift unit
300, 500, 700 register access unit
310 register group
510 transposition register group
860 input data rearrangement unit
870 output data rearrangement unit

The invention claimed is:

1. A transposition operation device comprising:
an operation circuit;
a processor, the processor including a register group storing therein a matrix of data as a target for operation and composed of a plurality of registers, each register storing therein elements in a respective row of the matrix, wherein the elements in the respective row of the matrix are stored before transposition upon one instruction, and elements in a respective row of a transformed matrix resulting from the transposition are read upon one instruction; and
a non-transitory computer-readable medium having stored therein executable instructions, which when executed by the processor, cause the transposition operation device to:
store, in a setting register, setting information indicating that the matrix is to be transposed, and, when the setting information is stored in the setting register, generate output rearrangement information, column position information, and input rearrangement information for the matrix, the output rearrangement information being used to rearrange elements in each row of the matrix to generate the transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements;

generate the transformed matrix by using the output rearrangement information;

write the transformed matrix to the register group, and output the elements in the same column of the matrix by offset-reading the transformed matrix from the register group and selecting, for each column of the transformed matrix, a different one of the registers by using the column position information; and rearrange the output elements by using the input rearrangement information; wherein the operation circuit is configured to perform an operation on the rearranged output elements.

2. The transposition operation device of claim 1, wherein the output rearrangement information includes an output circular shift amount indicating an amount of circular shift performed for each row of the matrix.

3. The transposition operation device of claim 2, wherein the input rearrangement information includes an input circular shift amount indicating an amount of circular shift performed for the output elements, the output circular shift amount indicates an amount of right circular shift and increases by one with an increasing row number, and the input circular shift amount has a same absolute value as the output circular shift amount and has an opposite sign to the output circular shift amount.

4. A transposition operation device comprising:
an operation circuit;
a processor, the processor including a register group storing therein a matrix of data as a target for operation and composed of a plurality of registers, each register storing therein elements in a respective row of the matrix, wherein the elements in the respective row of the matrix are stored before transposition upon one instruction, and elements in a respective row of a transformed matrix resulting from the transposition are read upon one instruction; and
a non-transitory computer-readable medium having stored therein executable instructions, which when executed by the processor, cause the transposition operation device to:
generate output rearrangement information, column position information, and input rearrangement information for the matrix, the output rearrangement information being used to rearrange elements in each row of the matrix to generate the transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements;
generate the transformed matrix by using the output rearrangement information;
write the transformed matrix to the register group, and output the elements in the same column of the matrix by offset-reading the transformed matrix from the register group and selecting, for each column of the transformed matrix, a different one of the registers by using the column position information; and
rearrange the output elements by using the input rearrangement information; wherein
the operation circuit is configured to perform an operation on the rearranged output elements,
the register group includes a dedicated register configured to store therein a matrix of data to be transposed, and
the output rearrangement information, the column position information, and the input rearrangement information are generated when a matrix of data is written and read to and from the dedicated register.

5. A transposition operation device comprising:
an operation circuit;
a processor, the processor including a register group storing therein a matrix of data as a target for operation and composed of a plurality of registers, each register storing therein elements in a respective row of the matrix, wherein the elements in the respective row of the matrix are stored before transposition upon one instruction, and elements in a respective row of a transformed matrix resulting from the transposition are read upon one instruction; and
a non-transitory computer-readable medium having stored therein executable instructions, which when executed by the processor, cause the transposition operation device to:
generate output rearrangement information, column position information, and input rearrangement information for the matrix, the output rearrangement information being used to rearrange elements in each row of the matrix to generate the transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements;
generate the transformed matrix by using the output rearrangement information;
write the transformed matrix to the register group, and output the elements in the same column of the matrix by offset-reading the transformed matrix from the register group and selecting, for each column of the transformed matrix, a different one of the registers by using the column position information; and
rearrange the output elements by using the input rearrangement information; wherein
the operation circuit is configured to perform an operation on the rearranged output elements,
an operation instruction executed by the transposition operation device includes information on whether each of a matrix as a target for the operation instruction and a matrix resulting from the execution of the operation instruction is to be transposed, and
the output rearrangement information, the column position information, and the input rearrangement information are generated by using the information included in the operation instruction.

6. An integrated circuit comprising:
a register group storing therein a matrix of data as a target for operation and composed of a plurality of registers, each register storing therein elements in a respective row of the matrix, wherein the elements in the respective row of the matrix are stored before transposition upon one instruction, and elements in a respective row of a transformed matrix resulting from the transposition are read upon one instruction;

a transposition control circuit including a setting register configured to store therein setting information indicating that the matrix is to be transposed, and configured to, when the setting information is stored in the setting register, generate output rearrangement information, column position information, and input rearrangement information for the matrix, the output rearrangement information being used to rearrange elements in each row of the matrix to generate the transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements;

an output data rearrangement circuit configured to generate the transformed matrix by using the output rearrangement information;

a register access circuit configured to (i) write the transformed matrix to the register group, and (ii) output the elements in the same column of the matrix by offset-reading the transformed matrix from the register group and selecting, for each column of the transformed matrix, a different one of the registers by using the column position information;

an input data rearrangement circuit configured to rearrange the output elements by using the input rearrangement information; and an operation circuit configured to perform an operation on the rearranged output elements.

7. A control method for controlling a processor as a transposition operation device, the processor including a register group storing therein a matrix of data as a target for operation and composed of a plurality of registers, each register storing therein elements in a respective row of the matrix, wherein the elements in the respective row of the matrix are stored before transposition upon one instruction, and elements in a respective row of a transformed matrix resulting from the transposition are read upon one instruction, the transposition operation device includes a setting register storing therein setting information indicating that the matrix is to be transposed, the control method comprising:

rearranging elements in each row of the matrix to generate the transformed matrix so that elements in a same column of the matrix are in different columns of the transformed matrix;

storing the transformed matrix in the register group;

generating column position information indicating positions in the register group at which the elements in the same column of the matrix are stored;

offset-reading the elements in the same column of the matrix from the register group by selecting, for each column of the transformed matrix, a different one of the registers by using the column position information;

rearranging the read elements; and performing an operation on the rearranged output elements, and when the setting information is stored in the setting register, the rearranging elements in each row of the matrix, the generating column position information, and the rearranging the read elements are performed.

8. An integrated circuit comprising:

a register group storing therein a matrix of data as a target for operation and composed of a plurality of registers, each register storing therein elements in a respective row of the matrix, wherein the elements in the respective row of the matrix are stored before transposition upon one instruction, and elements in a respective row of a transformed matrix resulting from the transposition are read upon one instruction;

a transposition control circuit configured to generate output rearrangement information, column position information, and input rearrangement information for the matrix, the output rearrangement information being used to rearrange elements in each row of the matrix to generate the transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements;

an output data rearrangement circuit configured to generate the transformed matrix by using the output rearrangement information;

a register access circuit configured to (i) write the transformed matrix to the register group, and (ii) output the elements in the same column of the matrix by offset-reading the transformed matrix from the register group and selecting, for each column of the transformed matrix, a different one of the registers by using the column position information;

an input data rearrangement circuit configured to rearrange the output elements by using the input rearrangement information; and an operation circuit configured to perform an operation on the rearranged output elements, wherein the register group includes a dedicated register configured to store therein a matrix of data to be transposed, and the transposition control circuit generates the output rearrangement information, the column position information, and the input rearrangement information when the register access circuit writes and reads a matrix of data to and from the dedicated register.

9. A control method for controlling a processor as a transposition operation device, the processor including a register group storing therein a matrix of data as a target for operation and composed of a plurality of registers, each register storing therein elements in a respective row of the matrix, wherein the elements in the respective row of the matrix are stored before transposition upon one instruction, and elements in a respective row of a transformed matrix resulting from the transposition are read upon one instruction, the register group includes a dedicated register configured to store therein a matrix of data to be transposed, and the control method comprising:

rearranging elements in each row of the matrix to generate the transformed matrix so that elements in a same column of the matrix are in different columns of the transformed matrix;

storing the transformed matrix in the register group;

generating column position information indicating positions in the register group at which the elements in the same column of the matrix are stored;

offset-reading the elements in the same column of the matrix from the register group by selecting, for each column of the transformed matrix, a different one of the registers by using the column position information;

rearranging the read elements; and performing an operation on the rearranged output elements, and when the storing writes a matrix of data to the dedicated register or the offset-reading reads a matrix of data from the dedicated register, the rearranging elements in each row of the matrix, the column position generating column position information, and the rearranging the read elements are performed.

10. An integrated circuit comprising:

a register group storing therein a matrix of data as a target for operation and composed of a plurality of registers, each register storing therein elements in a respective row of the matrix, wherein the elements in the respective row of the matrix are stored before transposition upon one instruction, and elements in a respective row of a transformed matrix resulting from the transposition are read upon one instruction;

a transposition control circuit configured to generate output rearrangement information, column position information, and input rearrangement information for the matrix, the output rearrangement information being used to rearrange elements in each row of the matrix to generate the transformed matrix so that elements in a same column of the matrix are in different columns of the transformed matrix, the column position information indicating positions in the register group at which the elements in the same column of the matrix are stored, the input rearrangement information being used, after the elements in the same column of the matrix are each read from the register group according to the column position information, to rearrange the read elements;

an output data rearrangement circuit configured to generate the transformed matrix by using the output rearrangement information;

a register access circuit configured to (i) write the transformed matrix to the register group, and (ii) output the elements in the same column of the matrix by offset-reading the transformed matrix from the register group and selecting, for each column of the transformed matrix, a different one of the registers by using the column position information;

an input data rearrangement circuit configured to rearrange the output elements by using the input rearrangement information; and an operation circuit configured to perform an operation on the rearranged output elements, wherein an operation instruction executed by the integrated circuit includes information on whether each of a matrix as a target for the operation instruction and a matrix resulting from the execution of the operation instruction is to be transposed, and the transposition control circuit generates the output rearrangement information, the column position information, and the input rearrangement information by using the information included in the operation instruction.

11. A control method for controlling a processor as a transposition operation device, the processor including a register group storing therein a matrix of data as a target for operation and composed of a plurality of registers, each register storing therein elements in a respective row of the matrix, wherein the elements in the respective row of the matrix are stored before transposition upon one instruction, and elements in a respective row of a transformed matrix resulting from the transposition are read upon one instruction, an operation instruction executed by the transposition operation device includes information on whether each of a matrix as a target for the operation instruction and a matrix resulting from the execution of the operation instruction is to be transposed, and the control method comprising:

rearranging elements in each row of the matrix to generate the transformed matrix so that elements in a same column of the matrix are in different columns of the transformed matrix by using the information included in the operation instruction with transposition;

storing the transformed matrix in the register group;

generating column position information indicating positions in the register group at which the elements in the same column of the matrix are stored by using the information included in the operation instruction with transposition;

offset-reading the elements in the same column of the matrix from the register group by selecting, for each column of the transformed matrix, a different one of the registers by using the column position information;

rearranging the read elements by using the information included in the operation instruction with transposition; and performing an operation on the rearranged output elements.

12. The transposition operation device of claim 1, wherein the executable instructions, when executed by the processor, further cause the transposition operation device to:

generate rows of the transformed matrix by rearranging the rows of the matrix, and write the transformed matrix by repeatedly performing processing of writing each of the rows of the transformed matrix to any one of the registers as many times as the number of the rows of the transformed matrix.

13. The transposition operation device of claim 4, wherein the executable instructions, when executed by the processor, further cause the transposition operation device to:

generate rows of the transformed matrix by rearranging the rows of the matrix, and write the transformed matrix by repeatedly performing processing of writing each of the rows of the transformed matrix to any one of the registers as many times as the number of the rows of the transformed matrix.

14. The transposition operation device of claim 5, wherein the executable instructions, when executed by the processor, further cause the transposition operation device to:

generate rows of the transformed matrix by rearranging the rows of the matrix, and write the transformed matrix by repeatedly performing processing of writing each of the rows of the transformed matrix to any one of the registers as many times as the number of the rows of the transformed matrix.

15. The transposition operation device of claim 1, wherein the offset-reading of the transformed matrix from the register group includes reading a data sequence, one element at a time, by using the column position information.

* * * * *